US011307617B2

(12) United States Patent
Ko et al.

(10) Patent No.: US 11,307,617 B2
(45) Date of Patent: Apr. 19, 2022

(54) ROLLABLE ELECTRONIC DEVICE INCLUDING CLEARANCE COMPENSATION STRUCTURE

(71) Applicant: Samsung Electronics Co., Ltd., Gyeonggi-do (KR)

(72) Inventors: Sungchan Ko, Gyeonggi-do (KR); Donghun Kim, Gyeonggi-do (KR); Jooho Seo, Gyeonggi-do (KR); Jaehyuk Lee, Gyeonggi-do (KR); Kicheol Pak, Gyeonggi-do (KR); Hankyung Ji, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/951,124

(22) Filed: Nov. 18, 2020

(65) Prior Publication Data
US 2021/0181800 A1    Jun. 17, 2021

(30) Foreign Application Priority Data

Dec. 16, 2019    (KR) .......................... 10-2019-0167775

(51) Int. Cl.
*G06F 1/16*    (2006.01)
(52) U.S. Cl.
CPC .................................. *G06F 1/1652* (2013.01)
(58) Field of Classification Search
CPC ............................... G06F 1/1652; G09F 9/301
See application file for complete search history.

(56) References Cited

U.S. PATENT DOCUMENTS 10,743,427 B2 *  8/2020  Huang ..................... H05K 5/03
10,881,009 B2 * 12/2020  Jiang .................... H05K 5/0017
(Continued)

FOREIGN PATENT DOCUMENTS

CN    102160364 B    1/2014
CN    110493398 A    11/2019
(Continued)

OTHER PUBLICATIONS

International Search Report dated Dec. 3, 2020.

*Primary Examiner* — Hung S. Bui
*Assistant Examiner* — Sagar Shrestha
(74) *Attorney, Agent, or Firm* — Cha & Reiter, LLC.

(57) ABSTRACT

According to certain embodiments, an electronic device comprises a first housing comprising a first plate having a first surface and a second surface facing away from the first surface, and a first side frame forming a first space and at least partially surrounding the first plate; and a second housing comprising a second plate comprising a third surface facing a same direction as the first surface and a fourth surface facing away from the third surface, and a second side frame forming a second space and at least partially surrounding the second plate, wherein at least a portion of the first side frame of the first housing is coupled to at least a portion of the second side frame to be slidable in a first direction, and the first housing movable between a slide-out state and a slide-in state relative to the second housing; a flexible display comprising: a first portion extending across at least a portion of the third surface; and a second portion extending from the first portion and located in the first space in the slide-in state of the first housing, wherein, when the first housing is switched from the slide-in state to the slide-out state, at least a portion of the second portion is exposed to an outside so as to form a substantially same plane as the first portion; and a clearance compensation (Continued)

structure disposed in the second space and configured to at least partially cover a clearance space generated between the second side frame and the flexible display when the first housing is switched from the slide-in state to the slide-out state.

20 Claims, 30 Drawing Sheets

(56) References Cited

U.S. PATENT DOCUMENTS

| | | | | |
|---|---|---|---|---|
| 10,955,876 | B1* | 3/2021 | Song | G06F 1/1656 |
| 11,140,252 | B1* | 10/2021 | Choi | G06F 1/1624 |
| 2011/0149492 | A1 | 6/2011 | Nakao et al. | |
| 2012/0212433 | A1* | 8/2012 | Lee | G06F 1/1652 |
| | | | | 345/173 |
| 2013/0058063 | A1* | 3/2013 | O'Brien | G06F 1/1652 |
| | | | | 361/807 |
| 2014/0211399 | A1* | 7/2014 | O'Brien | G06F 1/1652 |
| | | | | 361/679.26 |
| 2016/0147261 | A1* | 5/2016 | Bohn | H04B 1/3833 |
| | | | | 455/566 |
| 2018/0102072 | A1* | 4/2018 | Lee | G09F 9/301 |
| 2018/0103552 | A1* | 4/2018 | Seo | G06F 1/1624 |
| 2019/0305237 | A1* | 10/2019 | Shin | H01L 51/0097 |
| 2020/0348727 | A1* | 11/2020 | Lee | G06F 1/1626 |
| 2020/0363841 | A1* | 11/2020 | Kim | G06F 1/1624 |
| 2021/0352813 | A1* | 11/2021 | Cho | G06F 1/1656 |

FOREIGN PATENT DOCUMENTS

| | | |
|---|---|---|
| CN | 110572497 A | 12/2019 |
| KR | 10-2007-0025291 A | 3/2007 |
| KR | 10-1893203 B1 | 10/2018 |

* cited by examiner

ROLLABLE ELECTRONIC DEVICE INCLUDING CLEARANCE COMPENSATION STRUCTURE

CROSS-REFERENCE TO RELATED APPLICATION(S)

This application is based on and claims priority under 35 U.S.C. § 119 of a Korean patent application number 10-2019-0167775, filed on Dec. 16, 2019, in the Korean Intellectual Property Office, the disclosure of which is incorporated by reference herein its entirety.

BACKGROUND

1) Field

Certain embodiments relate to a rollable electronic device including a gap compensation structure.

2) Description of Related Art

While electronic devices having increasing numbers of functions, the display is generally limited to uniform rectangular shape that is generally about the size of a palm. However, increasing the size of the display can result in a larger electronic device that has less portability. For example, while the display can be made larger, this results in an electronic device with larger dimensions. With larger dimensions, the user may have difficulty, for example, carrying the electronic device in their pocket.

The above information is presented as background information only to assist with an understanding of the disclosure. No determination has been made, and no assertion is made, as to whether any of the above might be applicable as prior art with regard to the disclosure.

SUMMARY

According to certain embodiments, an electronic device comprises a first housing comprising a first plate having a first surface and a second surface facing away from the first surface, and a first side frame forming a first space and at least partially surrounding the first plate; and a second housing comprising a second plate comprising a third surface facing a same direction as the first surface and a fourth surface facing away from the third surface, and a second side frame forming a second space and at least partially surrounding the second plate, wherein at least a portion of the first side frame of the first housing is coupled to at least a portion of the second side frame to be slidable in a first direction, and the first housing movable between a slide-out state and a slide-in state relative to the second housing; a flexible display comprising: a first portion extending across at least a portion of the third surface; and a second portion extending from the first portion and located in the first space in the slide-in state of the first housing, wherein, when the first housing is switched from the slide-in state to the slide-out state, at least a portion of the second portion is exposed to an outside so as to form a substantially same plane as the first portion; and a clearance compensation structure disposed in the second space and configured to at least partially cover a clearance space generated between the second side frame and the flexible display when the first housing is switched from the slide-in state to the slide-out state.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Electronic devices may include a deformable and rollable type electronic device (hereinafter, referred to as a "rollable electronic device") in which a display area is expandable (e.g., a sliding-type electronic device or a rolling-type electronic device). The foregoing allows the user to enjoy a larger screen when stationary. However, when the user ports the electronic device, the user can reduce the dimensions, thereby causing the electronic device to, for example, fit in their pocket.

The rollable electronic device may include a first housing and a second housing that can be coupled to each other to be movable relative to each other by being at least partially fitted together. For example, the electronic device may include a first housing coupled so as to at least partially protrude from the second housing in an slide-out state. When including an internal driving mechanism, the electronic device may be automatically switched between the slide-out state and the slide-in state.

The rollable electronic device may include a flexible display the area of which is variable depending on whether the electronic device is in the slide-out state or in the slide-in state. For example, the rollable electronic device may operate to have a display area of a first size in the slide-in state (closed state) and a display area of a second size in the slide-out state (opened state), in which the second size is larger than the first size. When the rollable electronic device is in the slide-out state, the two housings coupled to be at least partially fitted together are deformed to be spaced apart from each other.

To allow one housing to slide-in/slide out of the other housing, one housing may be thinner than the other. Accordingly, when the rollable electronic device is in the slide out state, there may be a clearance (e.g., a gap or a space) between one of the housings and a flexible display. Foreign matter may enter the inside of the rollable electronic device through the clearance and may cause a malfunction.

Certain embodiments are able to provide a rollable electronic device including a clearance compensation structure.

Certain embodiments are able to provide a rollable electronic device including a clearance compensation structure capable of preventing inflow of external foreign matter by compensating for a clearance generated according to the opening operation of the housing.

Certain embodiments are able to provide a rollable electronic device including a clearance compensation structure capable of helping to secure reliability of the device by preventing a malfunction by blocking the inflow of foreign matter due to the opening and closing operation of the housing.

Figure 1:
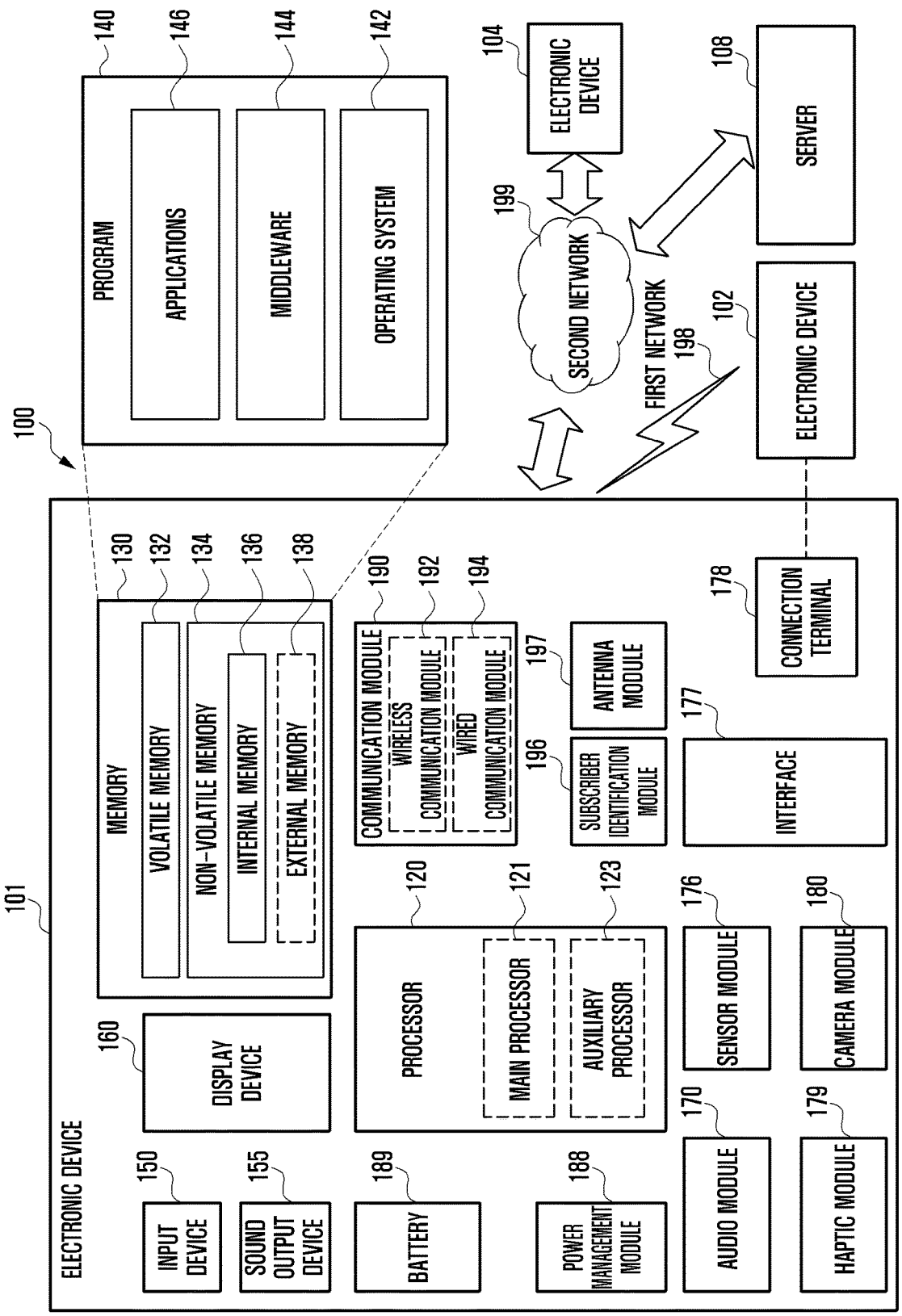
FIG. 1 is a block diagram of an electronic device according to certain embodiments in a network environment.

FIG. 1 will describes the various functional modules of the electronic device. FIGS. 2A-16B describe the housing of certain embodiments of the electronic device.

Electronic Device

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identity module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Certain embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While electronic devices having increasing numbers of functions, a dilemma can occur with the display 160. A small display 160 can cause a displeasing user experience, while a large display 160 can increase the dimensions of the electronic device 101, thereby reducing the portability of the electronic device 101.

To alleviate this, FIGS. 2A-3B illustrate a deformable and rollable type electronic device 200 (hereinafter, referred to as a "rollable electronic device") in which a display area is expandable (e.g., a sliding-type electronic device or a rolling-type electronic device). The electronic device 200 includes a first housing 210 and a second housing 220. The first housing 210 can be slide out of the second housing 220 (see FIG. 2B, 3B), thereby increasing the display 230 size when the user is stationary. However, when the user ports the electronic device 200, the user can slide the first housing 210 into the second housing 220. Sliding the first housing 210 into the second housing 220 reduces the dimensions of the electronic device 200.

Figure 2A:
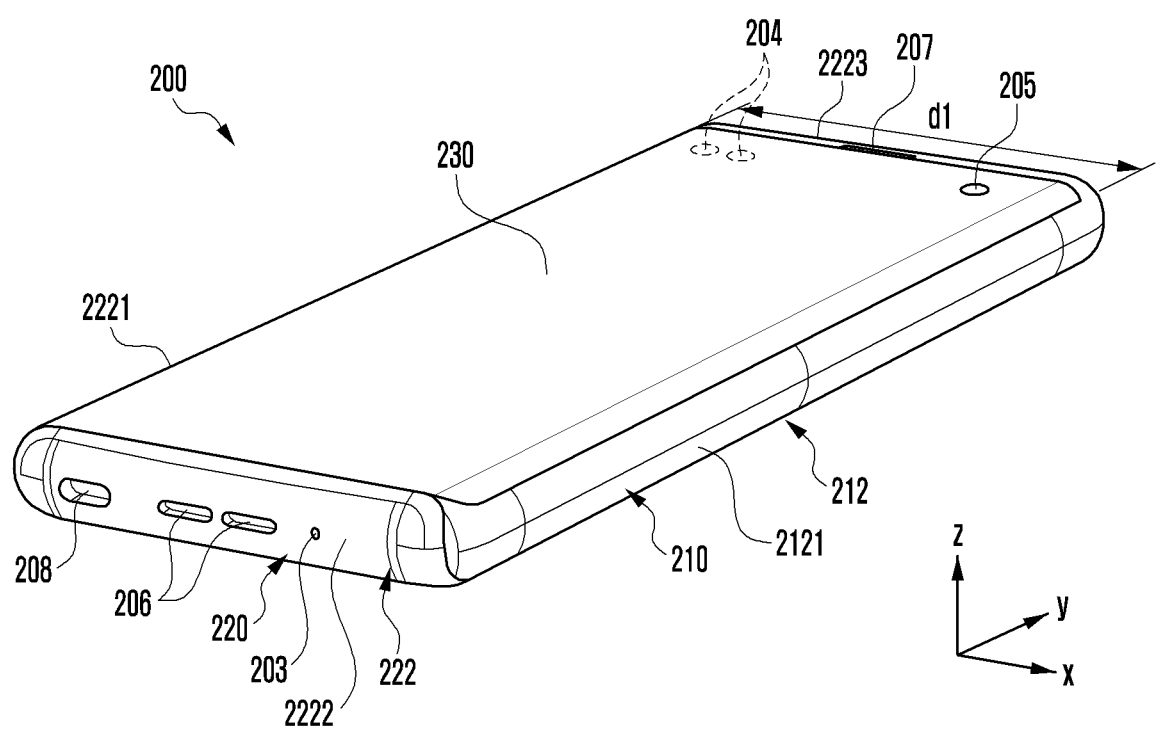
FIG. 2A is a perspective view illustrating the front side of an electronic device according to certain embodiments in the slide-in state.
Figure 2B:
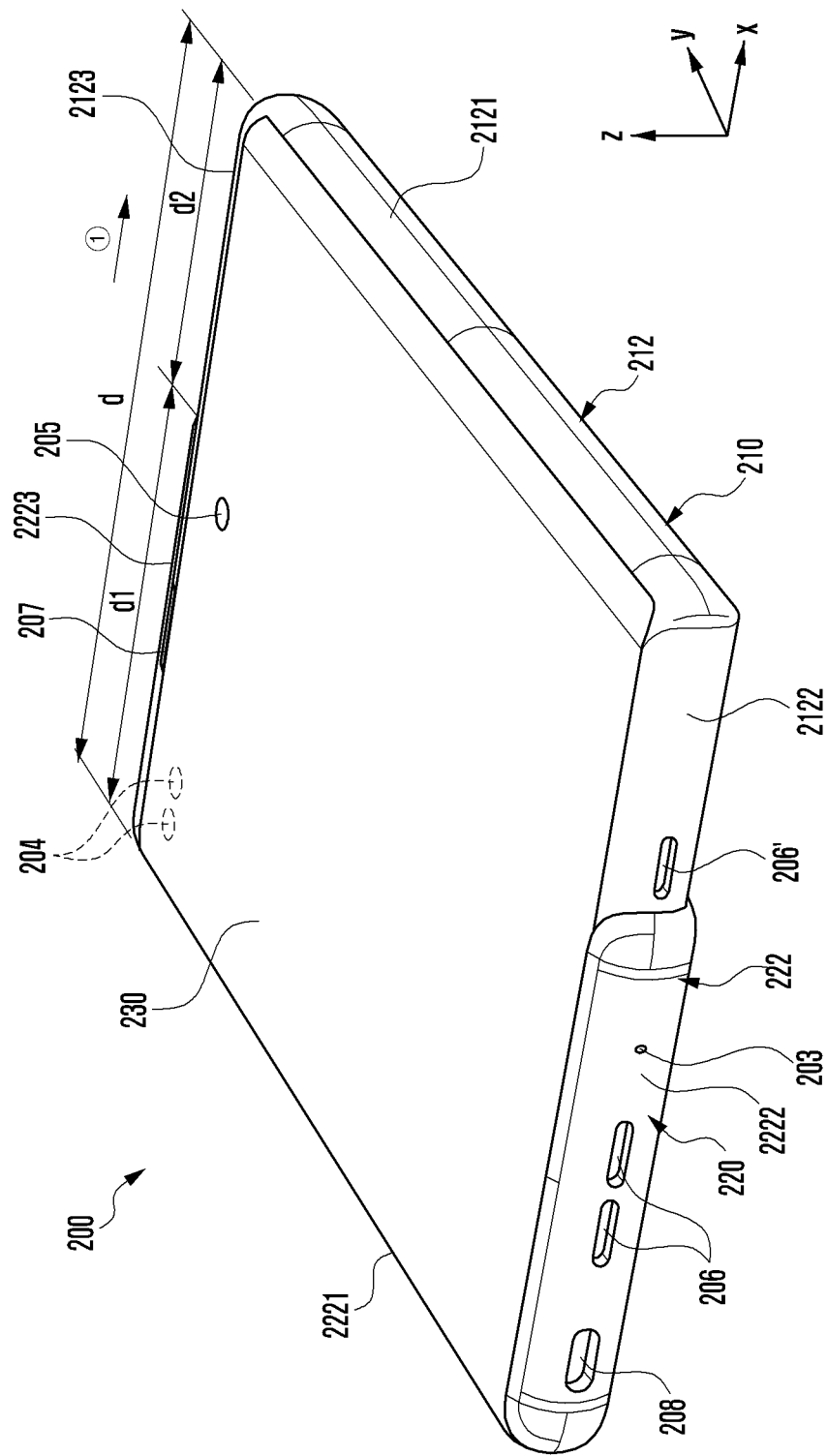
FIG. 2B is a perspective view illustrating the front side of the electronic device according to certain embodiments in the slide-out state.
Figure 3A:
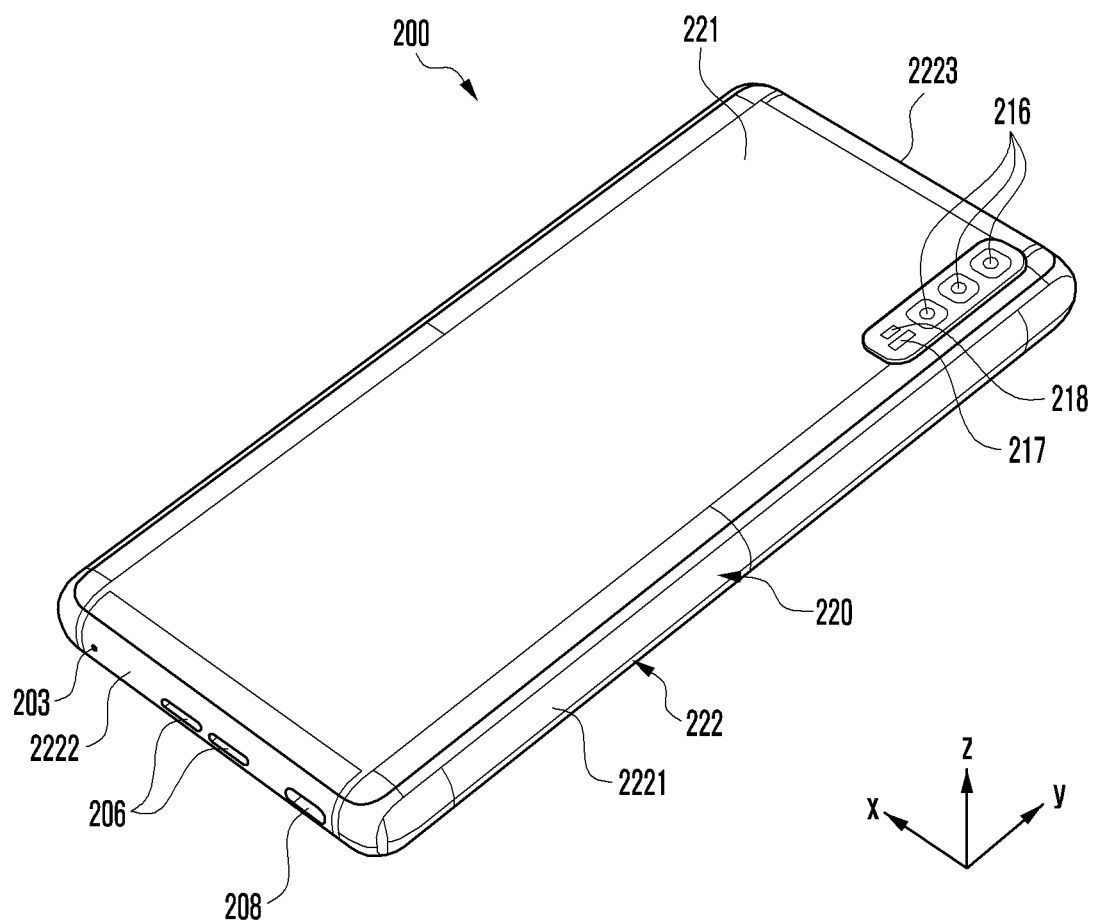
FIG. 3A is a perspective view illustrating the rear side of the electronic device according to certain embodiments in the slide-in state.
Figure 3B:
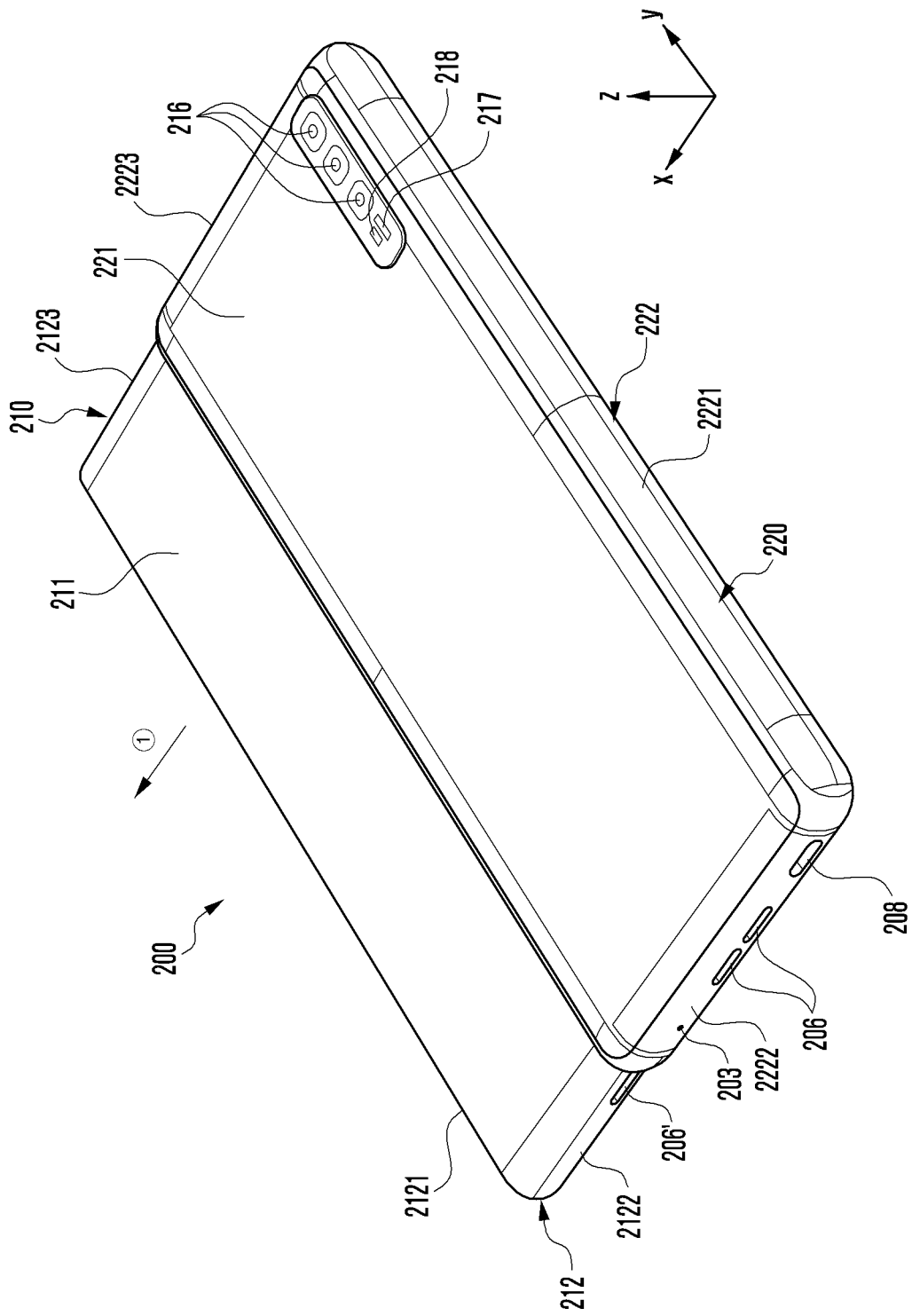
FIG. 3B is a perspective view illustrating the rear side of the electronic device according to certain embodiments in the slide-out state.

FIG. 2A is a perspective view illustrating the front side of an electronic device 200 according to certain embodiments in the slide-in state, and FIG. 2B is a perspective view illustrating the front side of the electronic device 200 according to certain embodiments in the slide-out state. FIG. 3A is a perspective view illustrating the front side of an electronic device 200 according to certain embodiments in the slide-in state, and FIG. 3B is a perspective view illustrating the front side of the electronic device 200 according to certain embodiments in the slide-out state.

The electronic device 200 of FIG. 2A may be at least partially similar to the electronic device 101 of FIG. 1 or may further include other embodiments of an electronic device.

Housing

Referring to FIGS. 2A to 3B, the electronic device 200 may include a first housing 210 and a second housing 220. The second housing 220 is coupled to the first housing 210, so that the first housing 210 is at least partially movable with respect to the second housing 220. According to an embodiment, the first housing 210 may include a first plate 211 and a first side frame 212. The first plate 211 and the first side frame 212 can extend in a substantially vertical direction (e.g., the z-axis direction) along the periphery of the first plate 211. The first side frame 212 may include a first side surface 2121, a second side surface 2122 extending from one end of the first side surface 2121, and a third side face 2123 extending from the other end of the first side face 2121. The first housing 210 may include a first space (e.g., the first space 2001 in FIG. 4A) which is at least partially closed from the outside by the first plate 211 and the first side frame 212.

According to certain embodiments, the second housing 220 may include a second plate 221 and a second side frame 222. The second plate 221 and the second side frame 222 can extend in a substantially vertical direction (e.g., the z-axis direction) along the periphery of the second plate 221. The second side frame 222 may include a fourth side surface 221 facing away from the first side surface 2121, a fifth side surface extending from one end of the fourth side surface and at least partially coupled to the second side surface 2122, and a sixth side surface 2223 extending from the other end of the fourth side surface 2221 and at least partially coupled to the third side surface 2123. In another embodiment, the fourth side surface 2221 may extend from a structure (e.g., the second guide plate 250 in FIG. 4A) other than the second plate 221 and may be coupled to the second plate 221.

The second housing 220 may include a second space (e.g., the second space 2002 in FIG. 4A) which is at least partially closed from the outside by the second plate 221 and the second side frame 222. According to an embodiment, the first plate 211 and the second plate 221 may be arranged so as to form at least partially the rear surface of the electronic device 200. The first plate 211, the second plate 221, the first side frame 212, and the second side frame 222 may be formed of, for example, a polymer, coated or colored glass, ceramic, metal (e.g., aluminum, stainless steel (STS), or magnesium), or a combination of two or more of these materials.

Flexible Display

According to certain embodiments, the electronic device 200 may include a flexible display 230 disposed to be supported by the first housing 210 and the second housing 220. The flexible display 230 may include a first portion 231 (e.g., a flat portion) and a second portion 232 (e.g., a bendable portion). The first portion (e.g., the first portion 231 in FIG. 4A) can be supported by the second housing 220. The second portion (e.g., the second portion 232 in FIG. 4A) can be extending from the first portion 231 and supported by the first housing 210. The second portion 232 of the flexible display 230 may be disposed in a first space (e.g., the first space 2001 in FIG. 4A) of the first housing 210 to prevent exposure to the outside when the electronic device 200 is closed (slide-in state), and may be exposed to the outside to extend from the first portion 231 while being supported by the first housing 210 when the electronic device 200 is opened (slide-out state)(e.g., opened state). Accordingly, the electronic device 200 may be a rollable electronic device in which the display screen of the flexible display 230 is expanded according to an open operation according to the movement of the first housing 210 from the second housing 200.

The flexible display 230 is configured to only display on the first portion 231 when the device is in the slide-in state, and display on the first portion 231 and the second portion 232 when the device is in the slide-out state. Thus, the active area of the flexible display 230 can be varied. In certain embodiments, the active area of the flexible display 230 can be varied based on the amount that the first housing 210 protrudes from the second housing 220.

Changing Between Open State and Slide-in State

According to certain embodiments, in the electronic device 200, the first housing 210 may be at least partially inserted into the a second space (e.g., the second space 2002 in FIG. 4A) of the second housing 220, and may be coupled to be movable in the illustrated direction ①. For example, in the slide-in state, the electronic device 200 is maintained in the state in which the first housing 210 and the second housing 220 are coupled to each such that the first side surface 2121 and the fourth side surface 2221 have a first distance d1 therebetween. When changed to the slide-out state, the electronic device 200 is maintained in the state in which the first housing 210 protrudes from the second housing 220 such that the first housing 210 protrudes from the second housing 220 by a predetermined distance d2. As a result, the first side surface 2121 and the fourth side surface 2221 have a second spacing distance d (or d1+d2) therebetween. According to an embodiment, the flexible display 230 may be supported by the first housing 210 and/or the second housing 220 such that both ends thereof have curved edges formed in a curved shape in the slide-out state.

Figure 4A:
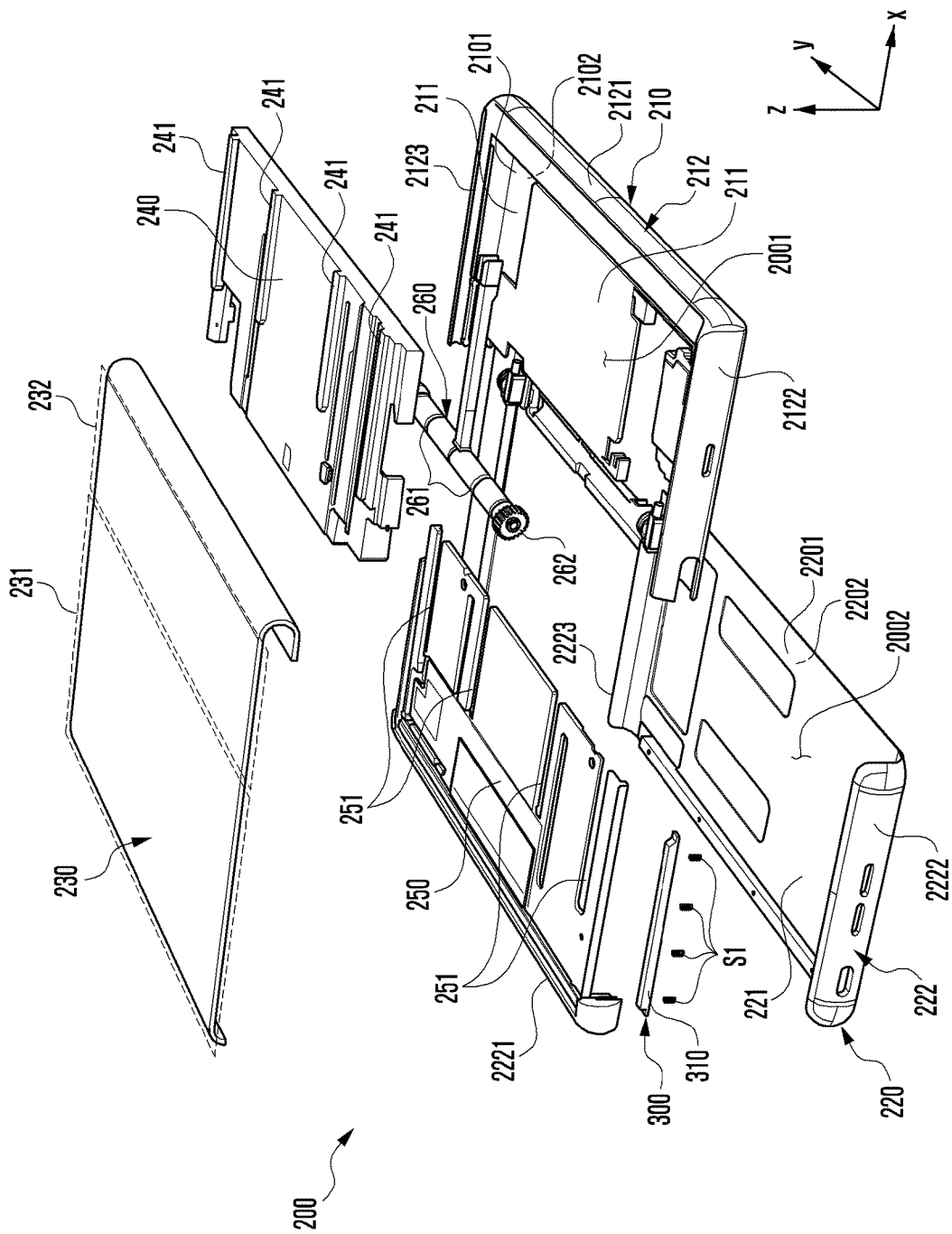
FIG. 4A is an exploded perspective view illustrating the electronic device according to certain embodiments.

According to certain embodiments, the electronic device 200 may be automatically switched between the slide-out state and the slide-in state by a driving unit (e.g., the driving unit 260 in FIG. 4A) disposed in the first space (e.g., the first space 2001 in FIG. 4A) and/or the second space (e.g., the second space 2002 in FIG. 4A). The driving unit 260 can be motorized. For example, the processor (e.g., the processor 120 of FIG. 1) of the electronic device 200 may be configured to control the operation of the first housing 210 via the driving unit 260 when detecting an event for switching between the slide-out state and the slide-in state of the electronic device 200. In another embodiment, the first housing 210 may manually protrude from the second housing 220 through the user's manipulation. In this case, the first housing 210 may protrude with a desired protrusion amount, and due to this, the screen of the flexible display 230 may also be variable so as to have various display areas. Accordingly, the processor (e.g., the processor 120 in FIG. 1) of the electronic device 200 may perform control such that an object is displayed in various ways and an application is executed in response to the display area corresponding to a predetermined protrusion amount of the first housing 210.

Input/Output Devices, Sensors, and Antennas

According to certain embodiments, the electronic device 200 may include at least one of an input device 203, sound output devices 206 and 207, sensor modules 204 and 217, camera modules 205 and 216, a connector port 208, a key input device (not illustrated), or an indicator (not illustrated). In another embodiment, the electronic device 200 may omit at least one of the above-mentioned components, or may additionally include other components.

According to certain embodiments, the input device 203 may include a microphone 203. In some embodiments, the input device 203 may include a plurality of microphones 203 arranged to sense the direction of sound. The sound output devices 206 and 207 may include speakers 206 and 207. The speakers 206 and 207 may include an external speaker 206 and a phone call receiver 207. In another embodiment, when the external speaker 206' is disposed in the first housing 210, in the slide-in state, sound may be output through the speaker hole 206 formed in the second housing 220. According to an embodiment, the microphone 203 or the connector port 208 may also be formed to have substantially the same configuration. In another embodiment, the sound output devices 206 and 207 may include a speaker (e.g., a piezo speaker) that operates without a separate speaker hole 206.

According to certain embodiments, the sensor modules 204 and 217 may generate an electrical signal or a data value corresponding to the internal operating state of the electronic device 200 or an external environmental state. The sensor modules 204 and 217 may include, for example, a first sensor module 204 (e.g., a proximity sensor or an illuminance sensor) and/or a second sensor module 217 (e.g., an HRM sensor) disposed on the rear surface of the housing 220. According to an embodiment, the first sensor module 204 may be disposed below the flexible display 230 in the second housing 220. According to an embodiment, the first sensor module 204 may further include at least one of a proximity sensor, an illuminance sensor 204, a time of flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to certain embodiments, the camera devices 205 and 216 may include a first camera device 205 disposed on the front surface of the second housing 220 of the electronic device 200 and a second camera 216 disposed on the rear surface of the second housing 220. According to an embodiment, the electronic device 200 may include a flash 218 disposed in the vicinity of the second camera 216. According to an embodiment, the camera devices 205 and 216 may include one or more lenses, an image sensor, and/or an image signal processor. According to an embodiment, the first camera device 205 may be disposed under the flexible display 230, and may be configured to image an object through a part of the active area of the flexible display 230. According to an embodiment, the flash 218 may include, for example, a light-emitting diode or a xenon lamp. In some embodiments, two or more lenses (e.g., a wide-angle lens and a telephoto lens) and image sensors may be disposed on one surface of the electronic device 200.

According to certain embodiments, the electronic device 200 may include at least one antenna (not illustrated). According to an embodiment, the at least one antenna may wirelessly communicate with an external electronic device (e.g., the electronic device 104 in FIG. 1), or may wirelessly transmit/receive power required for charging. According to an embodiment, the antenna may include a legacy antenna, a mmWave antenna, a nearfield communication (NFC) antenna, a wireless charging antenna, and/or a magnetic secure transmission (MST) antenna. In another embodiment, an antenna structure may be formed through at least a portion of the first side frame 212 and/or the second side frame 222, which are formed of metal.

Clearance Compensation Structure

When the electronic device 200 is changed to the slide-out state, the first housing 210 moves away from the second housing. As a result, a clearance area or opening can occur between the second side frame and a display. To prevent entry of foreign substances, certain embodiments can include a clearance compensation structure. In certain embodiments, the clearance compensation structure can include a guide block that is retracted when the electronic device 200 is in the slide-in state, and which protrudes or extends to at least partially cover the clearance area when the electronic device 200 is in the slide-out state.

Figure 4B:
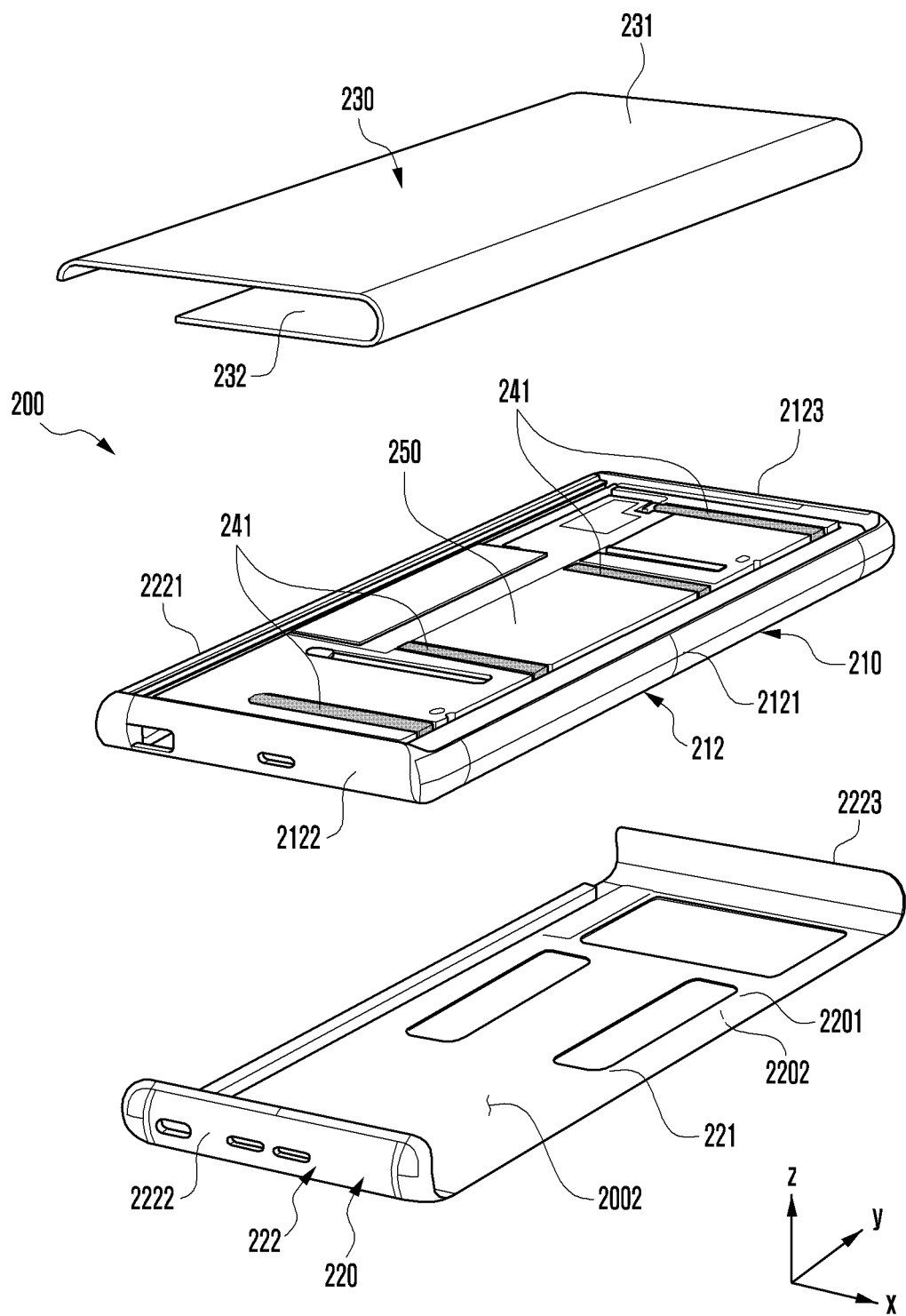
FIG. 4B is a view illustrating the electronic device of FIG. 4A in a partially coupled state.

FIG. 4A is an exploded perspective view illustrating the electronic device 200 according to certain embodiments. FIG. 4B is a view illustrating the electronic device 200 of FIG. 4A in a partially coupled state.

Referring to FIGS. 4A and 4B, the electronic device 200 may include a first housing 210 and a second housing 220 coupled to the first housing 210 to be at least partially movable. The first housing 210 can include a first guide plate 240 located in the first housing 210. The second housing 220 can include a second guide plate 250 located in the second housing 220. A driving unit can be disposed in a first space 2001 between the first housing 210 and the first guide plate 240. A flexible display 230 can be located to be supported by the first guide plate 240 and the second guide plate 250. A clearance compensation structure 300 is provided so as to compensate for a clearance (e.g., a clearance space) between the first housing 210 and the second housing 220 in the slide-out state.

According to certain embodiments, the first housing 210 may include a first plate 211 and a first side frame 212 extending in a substantially vertical direction (e.g., the z-axis direction) along the periphery of the first plate 211. The first side frame 212 may include a first side surface 2121, a second side surface 2122 extending from one end of the first side surface 2121, and a third side face 2123 extending from the other end of the first side face 2121. The first housing 210 may include a first space 2001 at least partially closed from the outside by the first guide plate 240, the first plate 211, and the first side frame 212.

According to certain embodiments, the second housing 220 may include a second plate 221 and a second side frame 222 extending in a substantially vertical direction (e.g., the z-axis direction) along the periphery of the second plate 221.

The second housing 220 may include a fourth side surface 2221 extending from one end of the second guide plate 250 and facing away from the first side surface 2121, a fifth side surface 2222 extending from at least a portion of the second plate 221 and at least partially coupled to the second side surface 2122, and a sixth side surface 2223 extending from at least a portion of the second plate 221 and at least partially coupled to the third side surface 2123. In another embodiment, the fourth side surface 2221 may be formed to extend from the second plate 221 rather than the second guide plate 250 and to be connected to the fifth side surface 2222 and the sixth side surface 2223. The first housing 220 may include a second space 2002 at least partially closed from the outside by the second guide plate 250, the second plate 221, and second first side frame 222. The first guide plate 240 and the second guide plate 250 may include a guide structure. The first guide plate 240 may include at least one first guide protrusion 241 protruding to the outside.

The second guide plate 250 may include at least one guide slit 251 formed at a position corresponding to at least one guide protrusion 241. For example, the first guide plate 240 may be guided in the x-axis direction with respect to the second guide plate 250 since the guide protrusion 241 is inserted into the guide slit 251. Therefore, the first housing 210 to which the first guide plate 240 is fixed may also be guided in the x-axis direction with respect to the second housing 220 to which the second guide plate 250 is fixed. In another embodiment, the electronic device 200 may have an additional guide structure through an structural change of each of the housings 210 and 220. For example, in the electronic device 200, the opening/closing of the first housing 210 may be guided in the manner in which a guide rib (e.g., the guide rib 215 in FIG. 13A) formed on the inner surface of the second side surface 2122 of the first housing 210 is guided in the x-axis direction along a guide rail (e.g., the guide rail 225 in FIG. 13A) formed on the inner surface of the fifth side surface 2222 of the housing 220.

According to an embodiment, the electronic device 200 may include a driving unit 260 fixed in the first space 211 between the first guide plate 240 and the first plate 211. The driving unit 260 may include at least one driving motor 261 and a pinion gear 262 rotated by receiving the driving force of the driving motor 261. The pinion gear 262 may mesh with a rack gear (e.g., the rack gear 252 in FIG. 6A) formed on the bottom surface of the second guide plate 250 when the first housing 210 and the second housing 220 are coupled to be slidable with respect to each other. The first housing 210 is opened/closed in the x-axis direction with respect to the second housing 220 according to the rotation of the pinion gear 262 meshing with the rack gear 252 formed on the second guide plate 250.

According to certain embodiments, the electronic device 200 may include a flexible display 230 disposed to be supported by the first housing 210 and the second housing 220. The flexible display 230 may include a first portion 231 supported by the second housing 220 and a second portion 232 extending from the first portion 231 and supported by the first housing 210. The second portion 232 may be disposed in the first space 2001 of the first housing 210 to prevent exposure to the outside when the electronic device 200 is closed (slide-in state), and may be exposed to the outside to extend from the first portion 231 while being supported by the first housing 210 when the electronic device 200 is opened (slide-out state).

According to certain embodiments, the electronic device 200 may include a clearance compensation structure 300 disposed in the second space 2002. The clearance compensation structure 300 may include a guide block for compensating for (e.g., blocking, closing, or sealing) a clearance portion between the second housing 220 and the first housing 210 when the electronic device 200 is open (slide-out state), and a plurality of coil springs S1 for pressing the guide block 310 toward the clearance portion. According to an embodiment, when the electronic device 200 is in the slide-out state, it is possible to prevent foreign matter from flowing into the clearance portion between the first housing 210 and the second housing 220 by the clearance compensation structure 300.

Figure 5A:
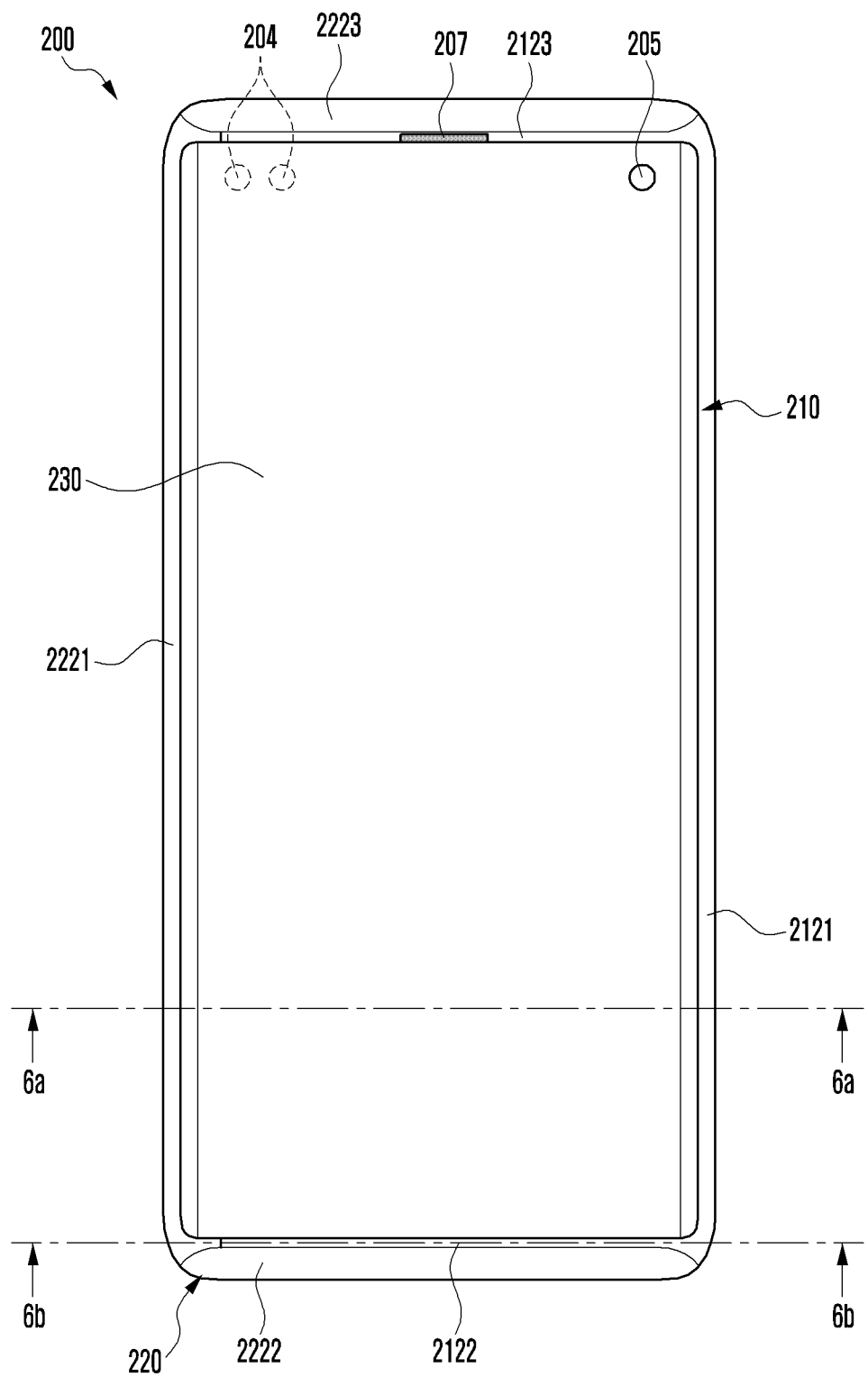
FIG. 5A is a plan view illustrating the electronic device according to certain embodiments in the slide-in state.
Figure 5B:
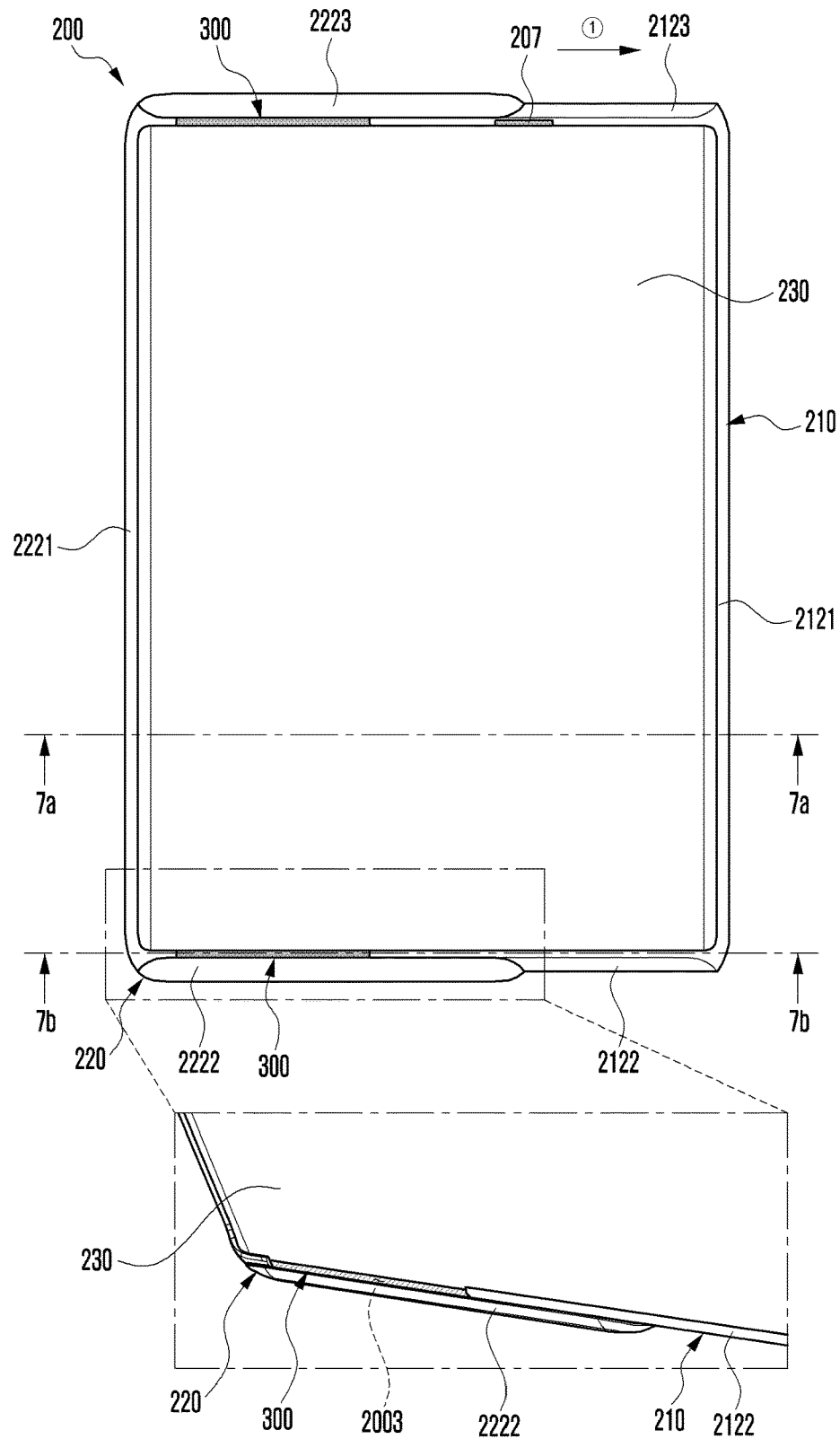
FIG. 5B is a plan view illustrating the electronic device according to certain embodiments in the slide-out state.

FIG. 5A is a plan view illustrating the electronic device 200 according to certain embodiments in the slide-in state, and FIG. 5B is a perspective view illustrating the electronic device 200 according to certain embodiments in the slide-out state.

Referring to FIGS. 5A and 5B, when the electronic device 200 is in the slide-in state, substantially most of the first housing 210 may be introduced into the second space 2002 in the second housing 220, and may be disposed such that only the first side surface 2121 is exposed to the outside. When the electronic device 200 is in the slide-out state, a portion of the first housing 210 protrudes from the second housing 220 by a predetermined protrusion amount in a first direction (direction ①) through a slide operation.

In this case, a portion of the second side surface 2121 of the first housing 210 and a portion of the third side surface 2221 may also be exposed to the outside. The first housing 210 and the second housing 220 are coupled to be slidable with respect to each other, and may be coupled to each other by being fitted to each other such that, in the slide-in state, the two housings are to be seen as one housing rather than as two housings (in order to make the electronic device slim and to form a beautiful appearance). In the slide-out state, the electronic device 200 may include a clearance (gap) 2003 (FIG. 5B) generated between the second housing 220 and the first housing 210 spaced apart from the second housing 220.

The clearance space 2003 occurs because the second side surface 2122 moves away from the fourth side surface 2221 when the electronic device 200 changes from the slide-in state to the slide-out state. That is, in the slide-in state, the second side surface 2122 and the fifth side surface 2222 completely cover the space between the second plate 221 and the first portion 231 of the flexible display 230. However, when the first housing 210 is moved, the second side surface 2122 moves, creating the clearance space between the fifth side surface 2222 and the first portion 231 of the flexible display 230.

Hereinafter, the clearance will be referred to as a "clearance space (e.g., a third space)". The clearance space 2003 may be connected to the second space 2002, and foreign matter flowing into the clearance space 2003 in the slide-out state may cause a malfunction of the electronic device 200 by flowing into the second space 2002 and the first space 2001.

According to an exemplary embodiment, the electronic device 200 may include a clearance compensation structure 300 provided in order to close the clearance space 2003 (e.g., a clearance portion) generated in the first housing 210 in the open state. The clearance compensation structure 300 may be disposed in the second space 2002 when the electronic device 200 is in the slide-in state and configured to be moved from the second space 2002 to the clearance space 2003 when the electronic device 200 is slide-out state. For example, the clearance compensation structure 300 may be configured to operate in cooperation with the movement of the first housing 210.

Hereinafter, the operation relationship of the clearance compensation structure 300 according to the operation of the electronic device will be described in detail.

Figure 6A:
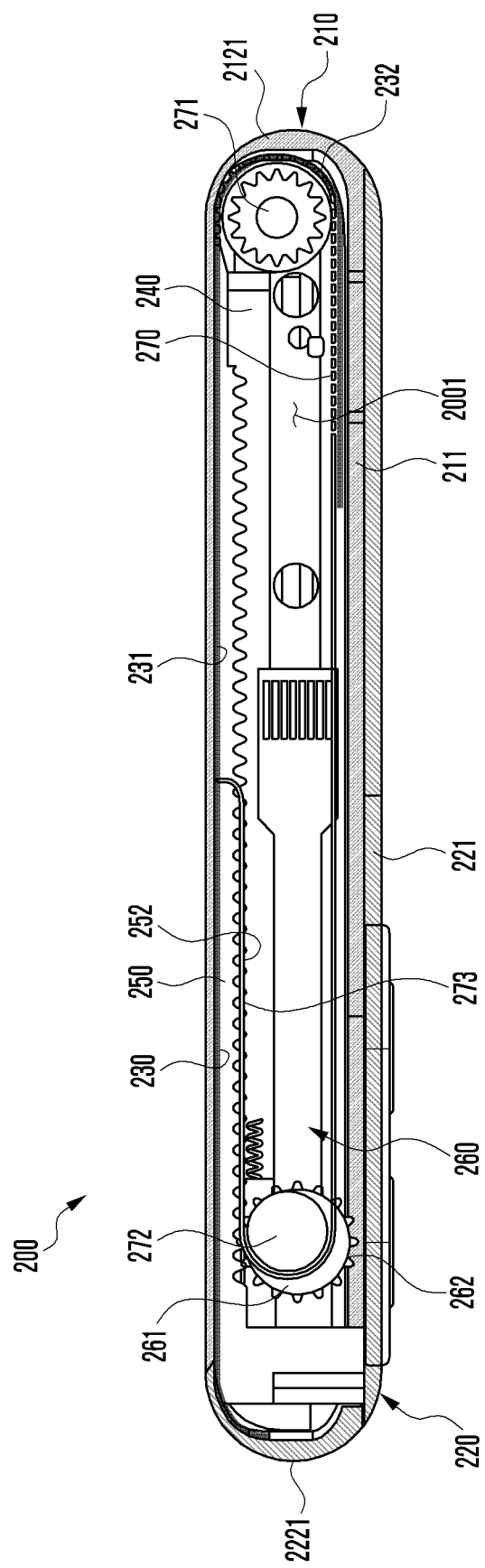
FIG. 6A is a cross-sectional view of the electronic device taken along line 6A-6A in FIG. 5A.
Figure 6B:
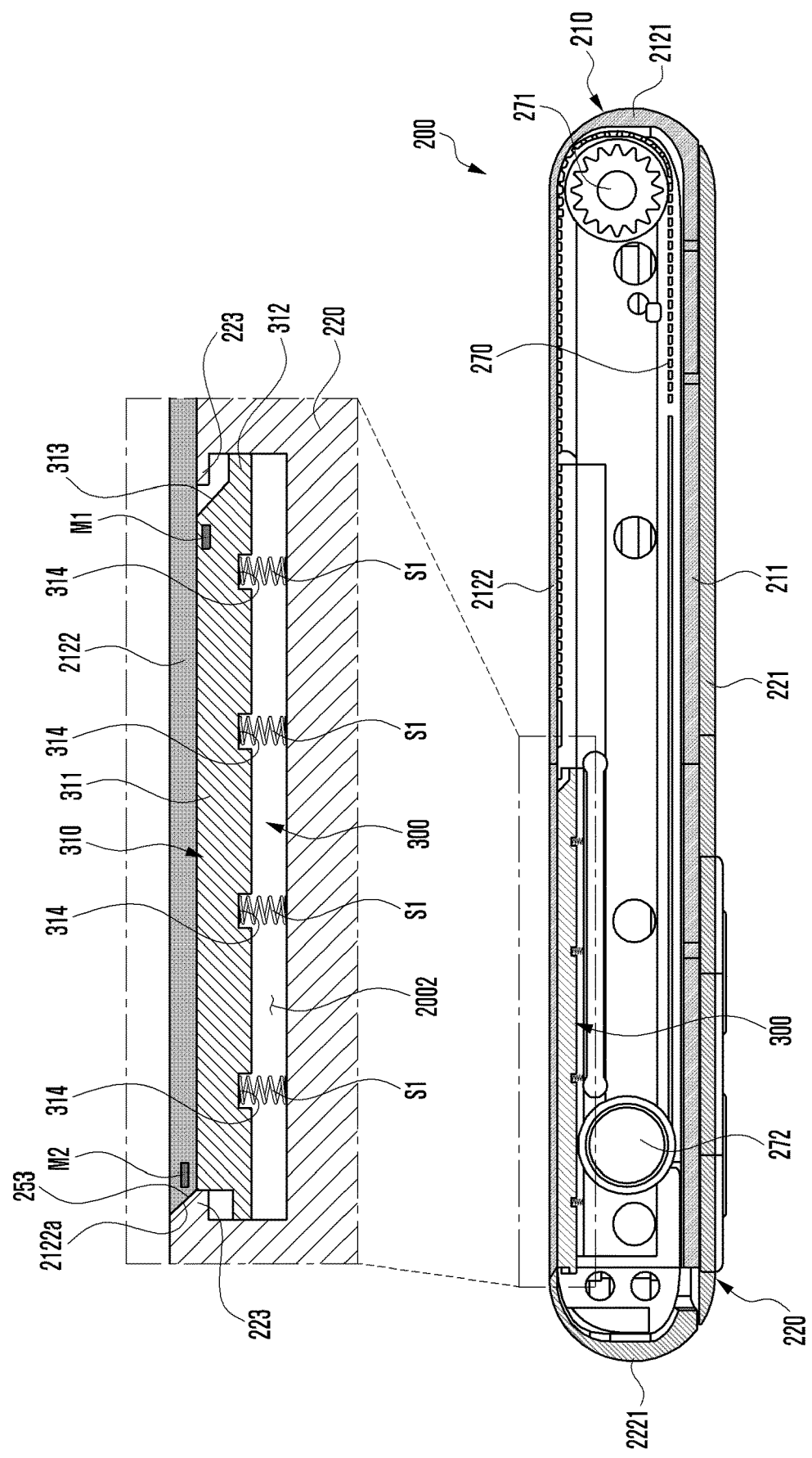
FIG. 6B is a cross-sectional view of the electronic device taken along line 6B-6B in FIG. 5A.
Figure 7A:
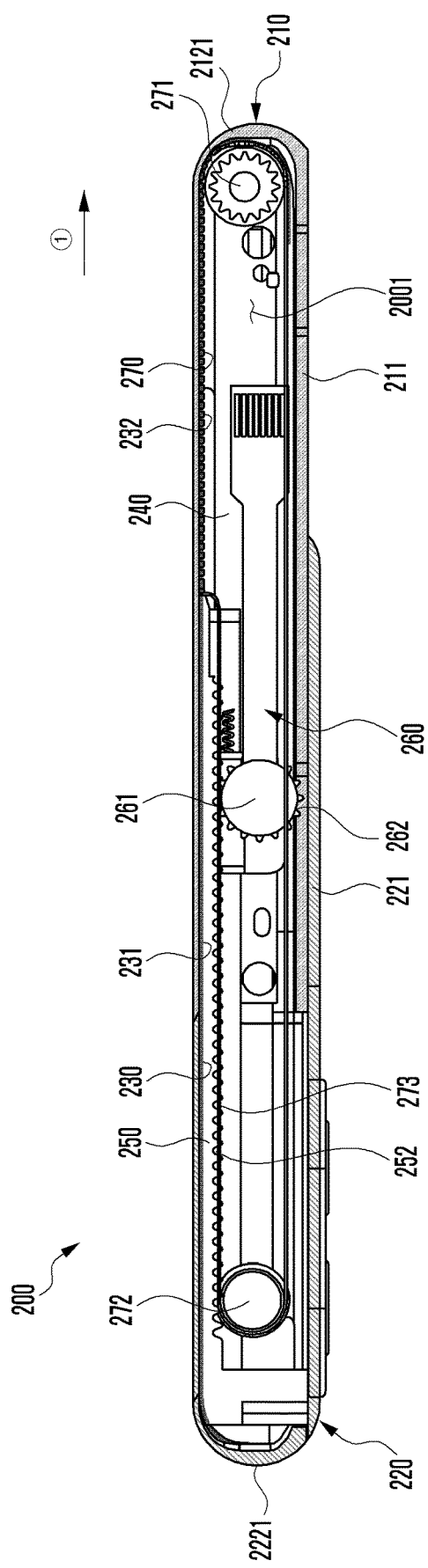
FIG. 7A is a cross-sectional view of the electronic device taken along line 7A-7A in FIG. 5B.
Figure 7B:
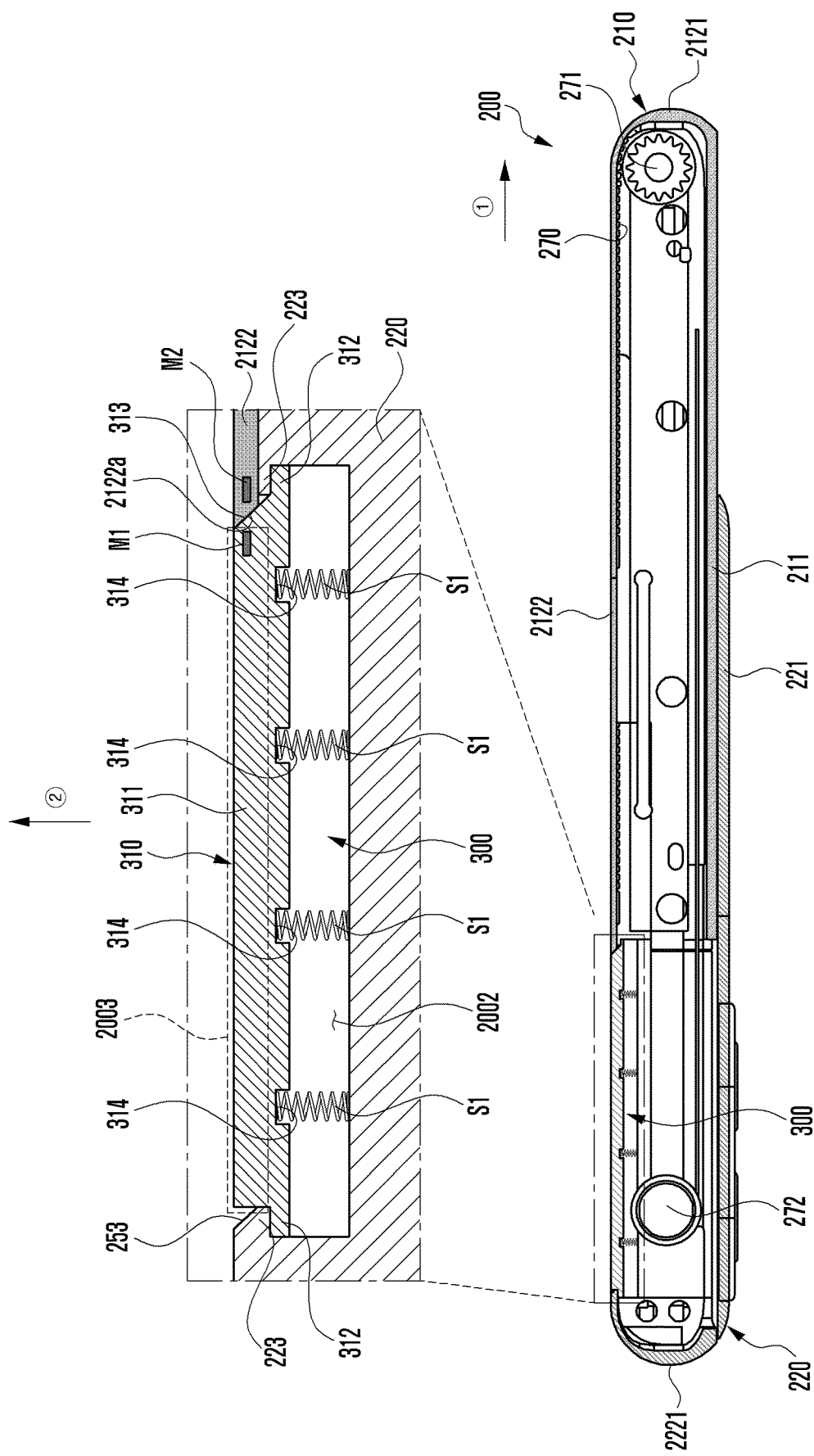
FIG. 7B is a cross-sectional view of the electronic device taken along line 7B-7B in FIG. 5B.
Figure 8A:
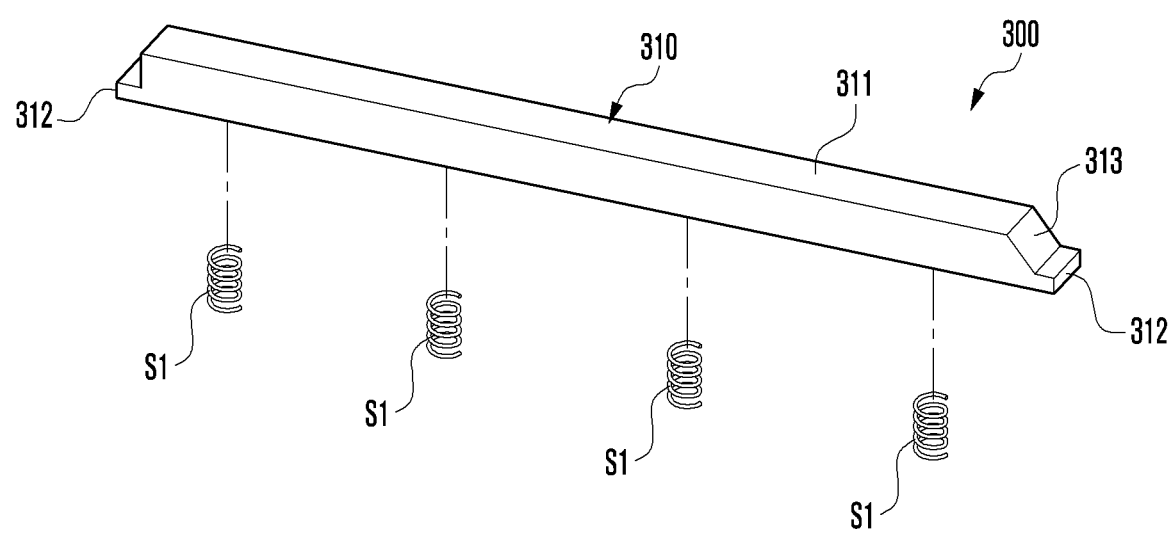
FIG. 8A is a perspective view illustrating the front side of the clearance compensation structure of FIG. 5B.

FIG. 6A is a cross-sectional view of the electronic device 200 taken along line 6A-6A in FIG. 5A. FIG. 6B is a cross-sectional view of the electronic device 200 taken along line 6B-6B in FIG. 5A. FIG. 7A is a cross-sectional view of the electronic device 200 taken along line 7A-7A in FIG. 5B. FIG. 7B is a cross-sectional view of the electronic device 200 taken along line 7B-7B in FIG. 5B. FIG. 8A is a perspective view illustrating the front side of the clearance compensation structure 300 of FIG. 5B, and FIG. 8B is a perspective view illustrating the rear side of the clearance compensation structure 300 of FIG. 5B.

Referring to FIG. 6A, in the slide-in state of the electronic device 200, substantially all of the first housing 210, except for the first side 2121, may be maintained in the state of being inserted into the second space 2002 of the second housing 220. In the slide-in state of the electronic device 200, the pinion gear 262 of the drive unit 260 fixed in the first space 2001 between the first guide plate 240 and the first plate 211 of the first housing 210 may mesh with a rack gear 252 disposed on the rear surface of the second guide plate 250 of the second housing 220. In this case, only the first portion 231 of the flexible display 230 may be exposed to the outside, and the second portion 232 may be introduced into the first space 2001 while being supported by the rollable module 270.

According to certain embodiments, the electronic device 200 may include a rollable module 270 disposed in the first space 2001 and the second space 2002 so as to support the flexible display 230. The rollable module 270 may include a plurality of bars connected to each other so as to be bent, and may be disposed so as to be at least partially wound on a first support shaft 271 disposed in the first space 2001 and a second support shaft 272 disposed in the second space 2002 and then to support the rear surface of the flexible display 230. The rollable module 270 may provide rigidity for display operation by supporting the rear surface of the flexible display 230. The first support shaft 271 and the second support shaft 272 may be connected by an elastic retention member 273 for maintaining elasticity of the flexible display 230.

Figure 8B:
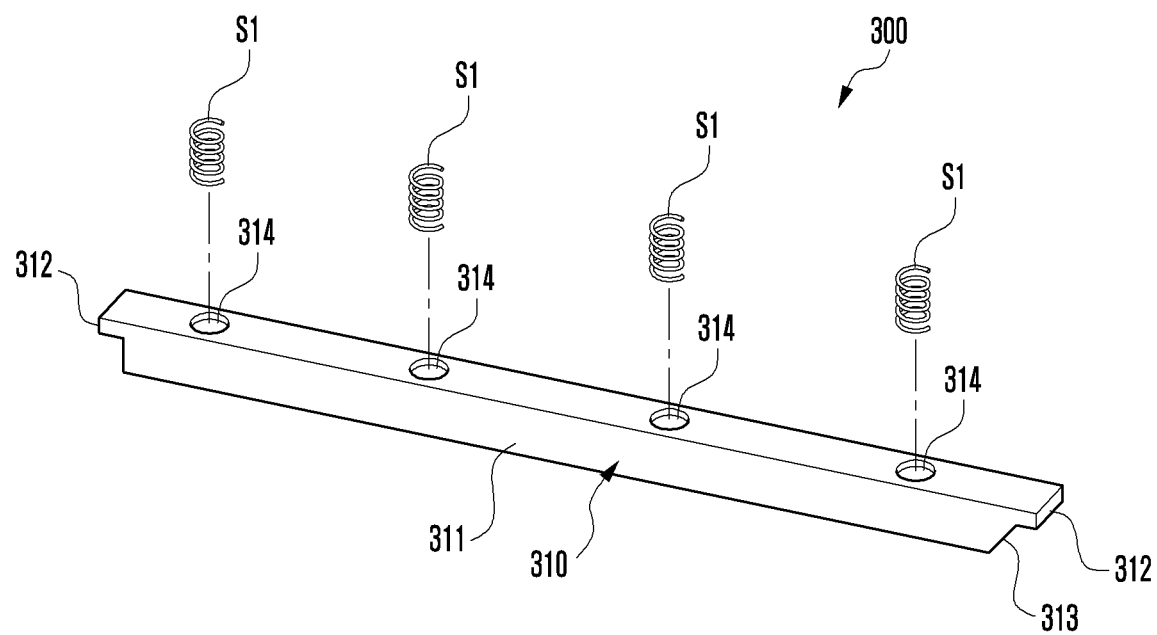
FIG. 8B is a perspective view illustrating the rear side of the clearance compensation structure of FIG. 5B.

Referring to FIG. 6B and FIGS. 8A and 8B, in the slide-in state, the clearance compensation structure 300 may be disposed to be regulated by the second side surface 2122 in the second space 2002. The clearance compensation structure 300 may include a guide block 310 disposed to be movable from the second space 2002 to the clearance space 2003, and a plurality of springs S1 configured to press the guide block 310 toward the clearance space 2003. The guide block 310 may include a body 311 having a predetermined length, and an engagement portion 312 formed to be engaged with an engagement step 223 formed in the second housing 220. In an embodiment, with the engagement structure in which the engagement portion 312 is engaged with the engagement step 223, the guide block 310 might not completely depart from the second space 2002. According to an embodiment, the guide block 310 includes recesses 314 formed in the surface facing the coil springs S1, and the coil springs S1 are partially received in the recesses 314, respectively, thereby being prevented from being arbitrarily disengaged from the guide block 310. According to an embodiment, the guide block 310 may include an inclined portion 313 formed in an area corresponding to an end portion of the second side surface 2122 of the first housing 210. According to an embodiment, the inclined portion 313 may be formed to have an inclined angle capable of moving the guide block 310 from the clearance space 2003 to the second space 2002 by being pressed by an end of the second side surface 2122. According to an embodiment, the guide block 310 may have the same material and/or the same color as the first housing 210 and the second housing 220. According to another embodiment, the guide block 310 may have a material (e.g., a metal material) and/or a color different from those of the first housing 210 and the second housing 220.

Referring to FIG. 7A, when the electronic device 200 is switched from the slide-in state to the slide-out state, the processor of the electronic device 200 may control the driving unit 260 to rotate the pinion gear 262. In this case, through the pinion gear 262 rotating on the engaged rack gear 252, the first housing 210 may be moved in a first direction (direction ①). At the same time, via the rollable module 270, the second portion 232 of the flexible display 230 introduced into the first space 2001 may be disposed to be exposed to the outside by extending from the first portion 231.

Referring to FIG. 7B, when the electronic device 200 is switched from the slide-in state to the slide-out state, the second side surface 2122 is also moved together with the first housing 210 and is regulated by the second side surface 2122, and the guide block 310 disposed in the second space 2002 protrudes in the second direction (direction ②) toward the clearance space 2003 by being pressed by the coil springs S1, whereby the clearance space 2003 can be closed. Accordingly, foreign matter flowing into the clearance space 2003 may be blocked by the guide block 310 of the clearance compensation structure 300.

According to certain embodiments, the guide block 310 may include a magnetic force generation member M1 (or magnet) disposed in a region adjacent to an end of the second side surface 2122. According to an embodiment, the first housing 210 may include a magnetic force reaction member M2 disposed at a position affected by the magnetic force (e.g., attractive force) of the magnetic force generation member M1 in the second side surface 2122. According to an embodiment, the magnetic force generation member M1 may include a magnet. According to an embodiment, the magnetic force reaction member M2 may include a metal member or another magnet that responds to the magnetic force of the magnet. According to an embodiment, in the state in which the electronic device 200 is opened, the magnetic force generation member M1 is disposed at a position that affects the magnetic force reaction member M2, thereby preventing the guide block 310 introduced into the clearance space 2003 from accidentally moving or moving into the second space 2002. In another embodiment, the magnetic force generation member M1 may be disposed on the second side surface 2122, and the magnetic force reaction member M2 may be disposed on the guide block 310.

Figure 9:
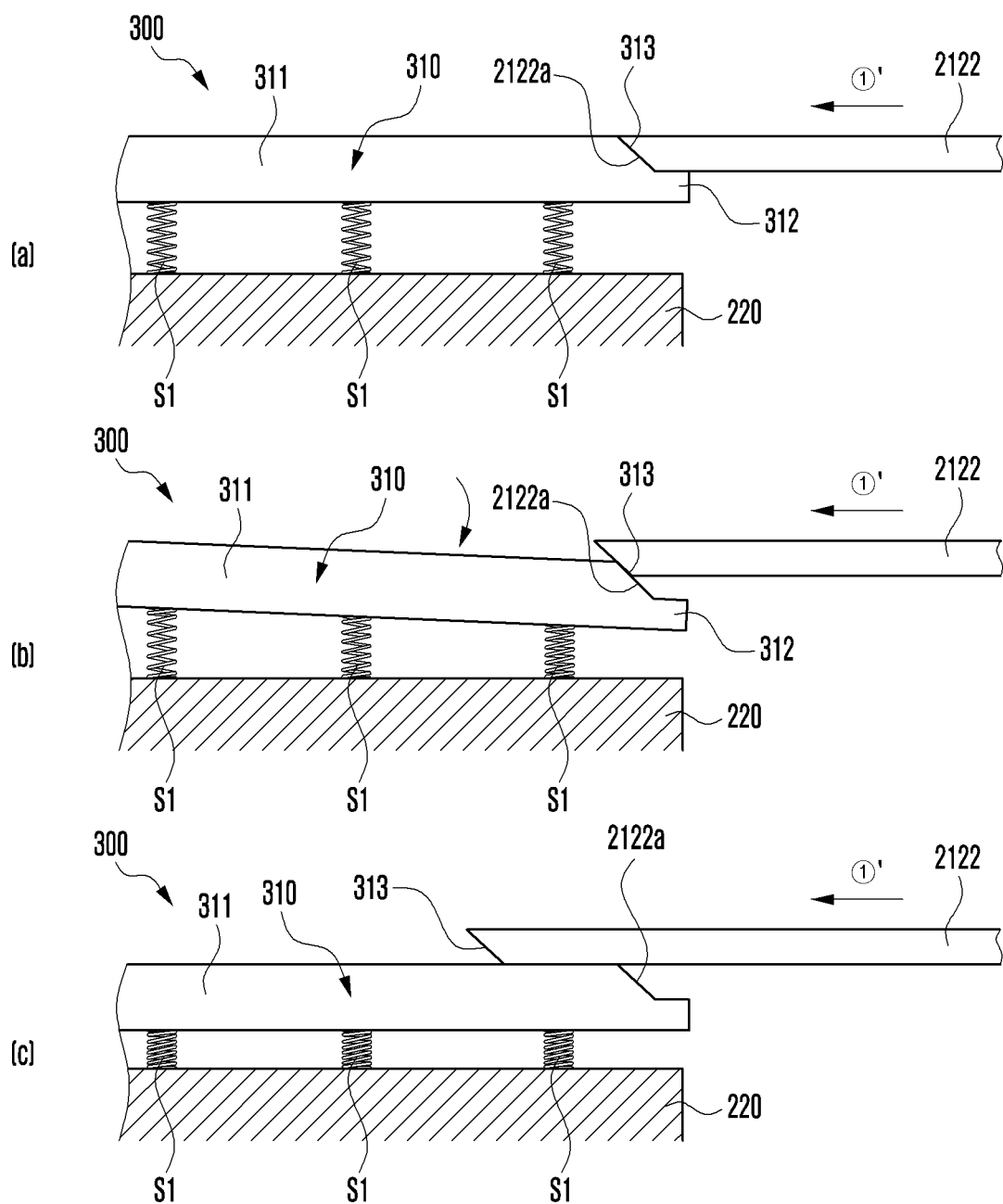
FIG. 9 is a view illustrating the operation of the clearance compensation structure of FIG. 5B.

FIG. 9 is a view illustrating the operation of the clearance compensation structure 310 of FIG. 5B.

Referring to FIG. 9(a), when the electronic device 200 is switched from the slide-in state to the slide-out state, the guide block 310 of the clearance compensation structure 300 may be disposed parallel to the second side surface 2122 of the first housing 210 and may close the clearance space 2003. According to an embodiment, the second side surface 2122 may have an inclined surface 2122a corresponding to the inclined portion 313 of the guide block 310. According to an embodiment, in the state in which the electronic device 200 is opened, the inclined surface 2122a of the second side surface 2122 and the inclined portion 313 of the guide block 310 may be in surface contact with each other, thereby closing the clearance space 2003. According to an embodiment, the inclined portion 313 and the inclined surface 2122a may be at least partially in surface contact with flat surfaces, or at least partially in surface contact with curved surfaces.

Referring to FIG. 9(b), when the first housing 210 is moved in the closing direction (direction ①') via the driving unit 260, the inclined surface 2122a of the side surface 2122 may press the inclined portion 313 of the guide block 310. In this case, through the linear movement and the inclined structure of the second side surface 2122, the guide block 310 may be moved downward (toward the second space).

Referring to FIG. 9(c), when the first housing 210 is further moved in the closing direction (direction ①'), the inclined surface 2122a of the second side surface 2122 completely rides over the inclined portion 313 of the guide block 310, and the state in which the bottom surface of the second side surface 2122 presses the top surface of the guide block 310 may be changed. Thereafter, through the continuous movement of the first housing 210, the guide block 310 may be moved to the second space 2002 in the second housing 220, and the second side surface 2122 of the first housing 210 and the fifth side surface 2222 of the second housing 220 may be switched to the slide-in state in which the that the second side surface 2122 and the fifth side surface 2222 are seamlessly coupled.

Figure 10A:
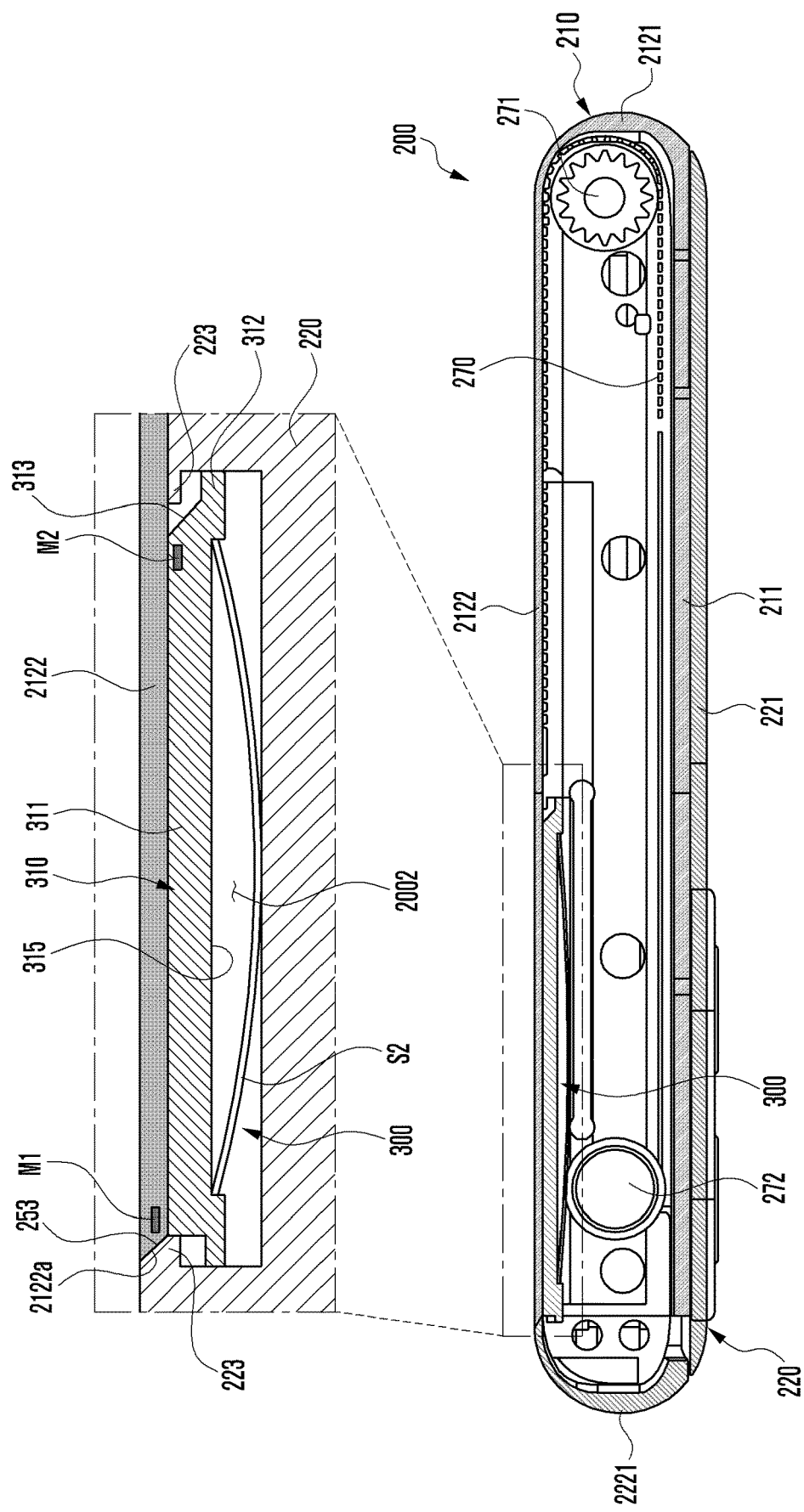
FIG. 10A is a cross-sectional view illustrating the electronic device including a clearance compensation structure according to certain embodiments in the slide-in state.
Figure 11A:
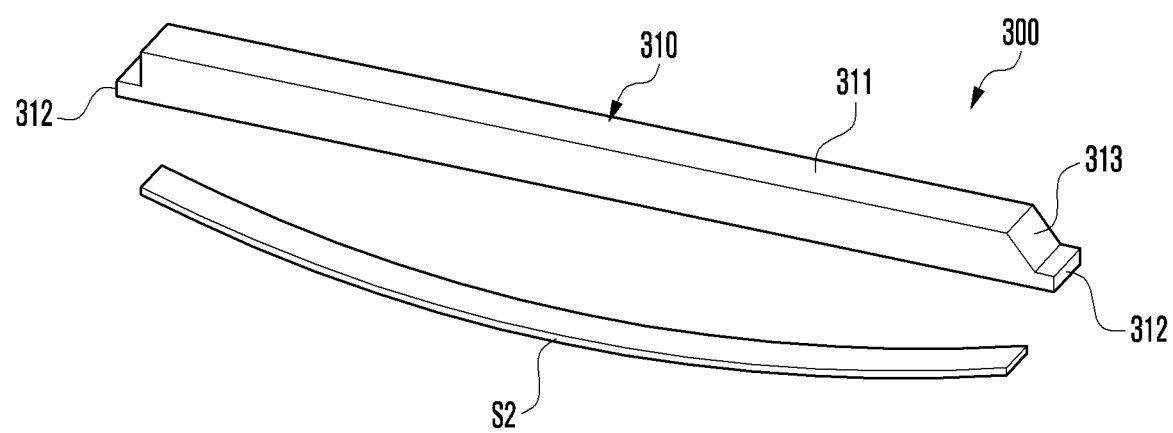
FIG. 11A is a perspective view illustrating the front side of the clearance compensation structure of FIG. 10A.
Figure 11B:
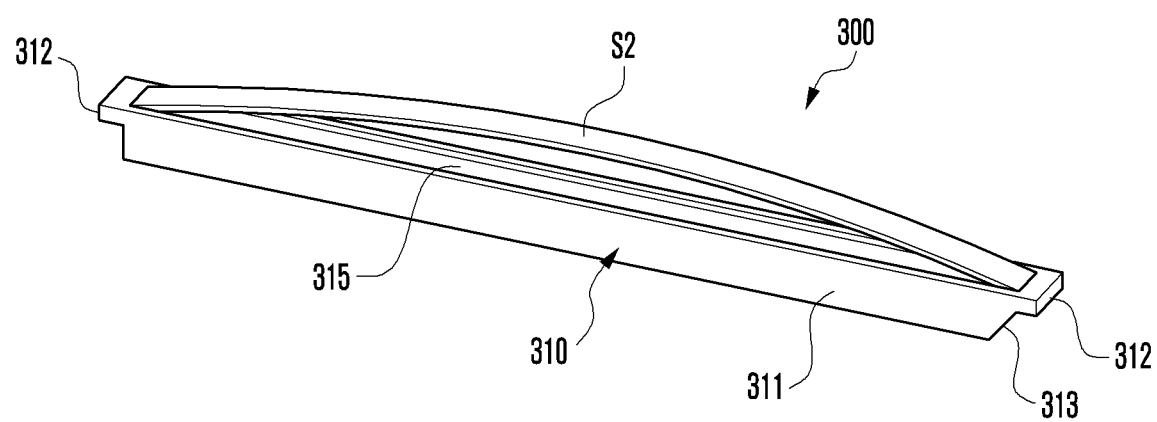
FIG. 11B is a perspective view illustrating the rear side of the clearance compensation structure of FIG. 10A.

FIG. 10A is a cross-sectional view illustrating the electronic device 200 including the clearance compensation structure 300 according to certain embodiments in the slide-in state, and FIG. 5B is a cross-sectional view illustrating the electronic device 200 including the clearance compensation structure 300 according to certain embodiments in the slide-out state. FIG. 11A is a perspective view illustrating the front side of the clearance compensation structure of FIG. 10A, and FIG. 11B is a perspective view illustrating the rear side of the clearance compensation structure of FIG. 10A.

Figure 10B:
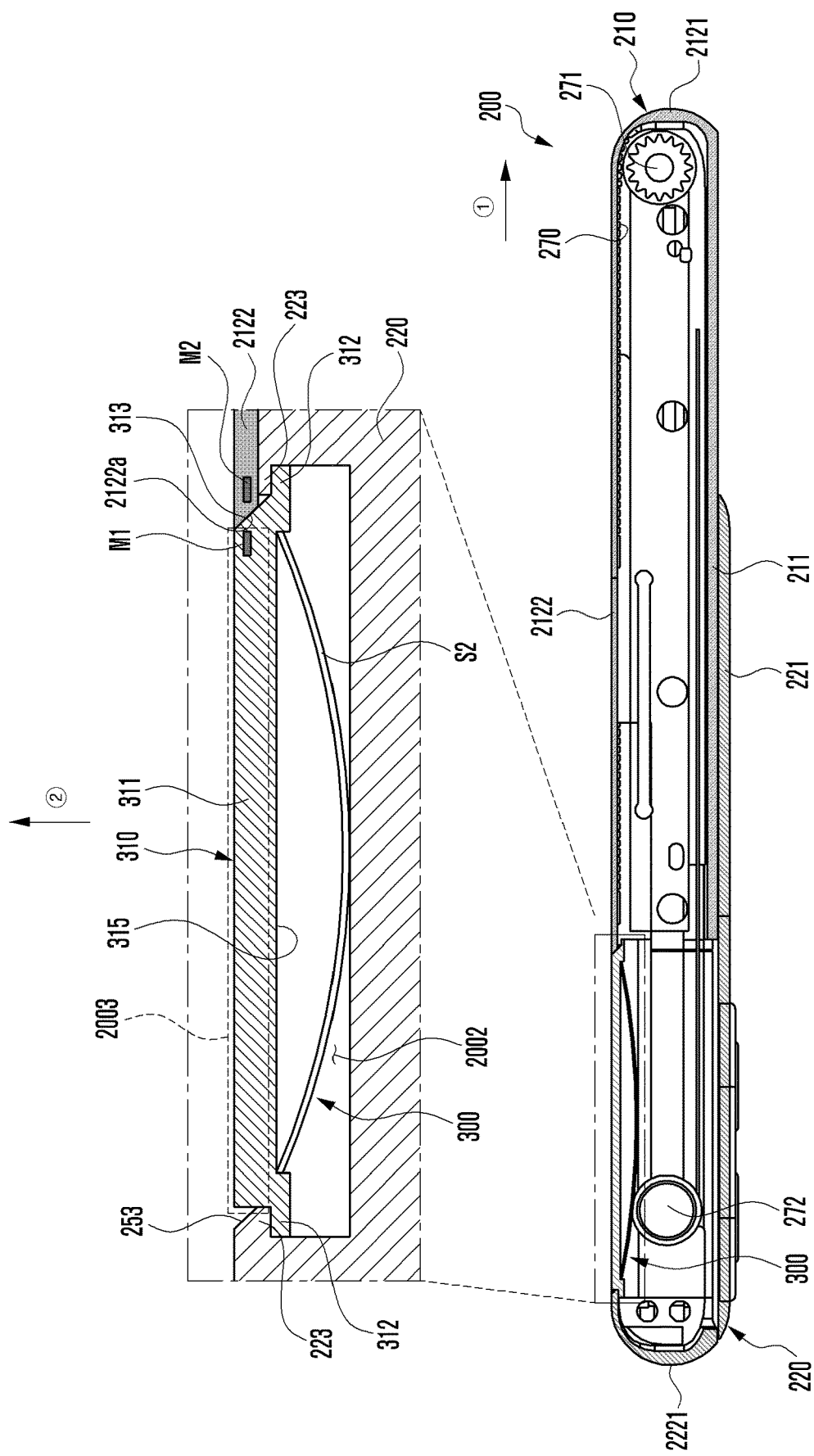
FIG. 10B is a cross-sectional view illustrating the electronic device including the clearance compensation structure according to certain embodiments in the slide-out state.

In describing the components of the electronic device 200 of FIGS. 10A and 10B, the same reference numerals are given to components that are substantially the same as those of the electronic device 200 of FIGS. 6B and 7B, and a detailed description thereof may be omitted.

Referring to FIGS. 10A to 11B, as the elastic member supporting the guide block 310 of the clearance compensation structure 300, a plate-shaped spring S2 may be used instead of the coil springs S1. In this case, the rear surface of the guide block 310 of the clearance compensation structure 300 may include a recess 315 for supporting the both ends of the plate-shaped spring S2. According to an embodiment, since the plate-shaped spring S2 is supported by the recess 315 while retaining elasticity, the plate-shaped spring S2 can be prevented from accidentally departing from the second space 2002.

According to certain embodiments, the clearance compensation structure 300 is applied in order to close the clearance space 2003 (e.g., a clearance portion) formed between the second side surface 2122 of the first housing 210 and the fifth side surface 2222 of the second housing 220, but is not limited thereto. For example, it is obvious that, in the state in which the electronic device 200 is opened, the clearance compensation structure 300 can be used in order to close the space formed between the third side surface 2123 of the first housing 210 and the sixth side surface 2223 of the second housing 220.

According to another embodiment, the clearance space 2003 is not limited to the clearance space 2003 (e.g., a clearance portion) formed between the second side surface 2122 of the first housing 210 and the fifth side surface 2222 of the second housing 220. For example, when such a clearance portion occurs in another guide structure exposed to the outside of the two housings 210 and 220, the clearance compensation structure 300 according to an exemplary embodiment may be applied in order to close the clearance portion. In addition, besides the coil springs (S1) and the plate-shaped spring (S2), the elastic member according to an exemplary embodiment may be replaced with at least one known elastic member (e.g., an elastic clip, an elastic pogo pin structure, or an elastic material such as rubber or silicone).

Figure 12A:
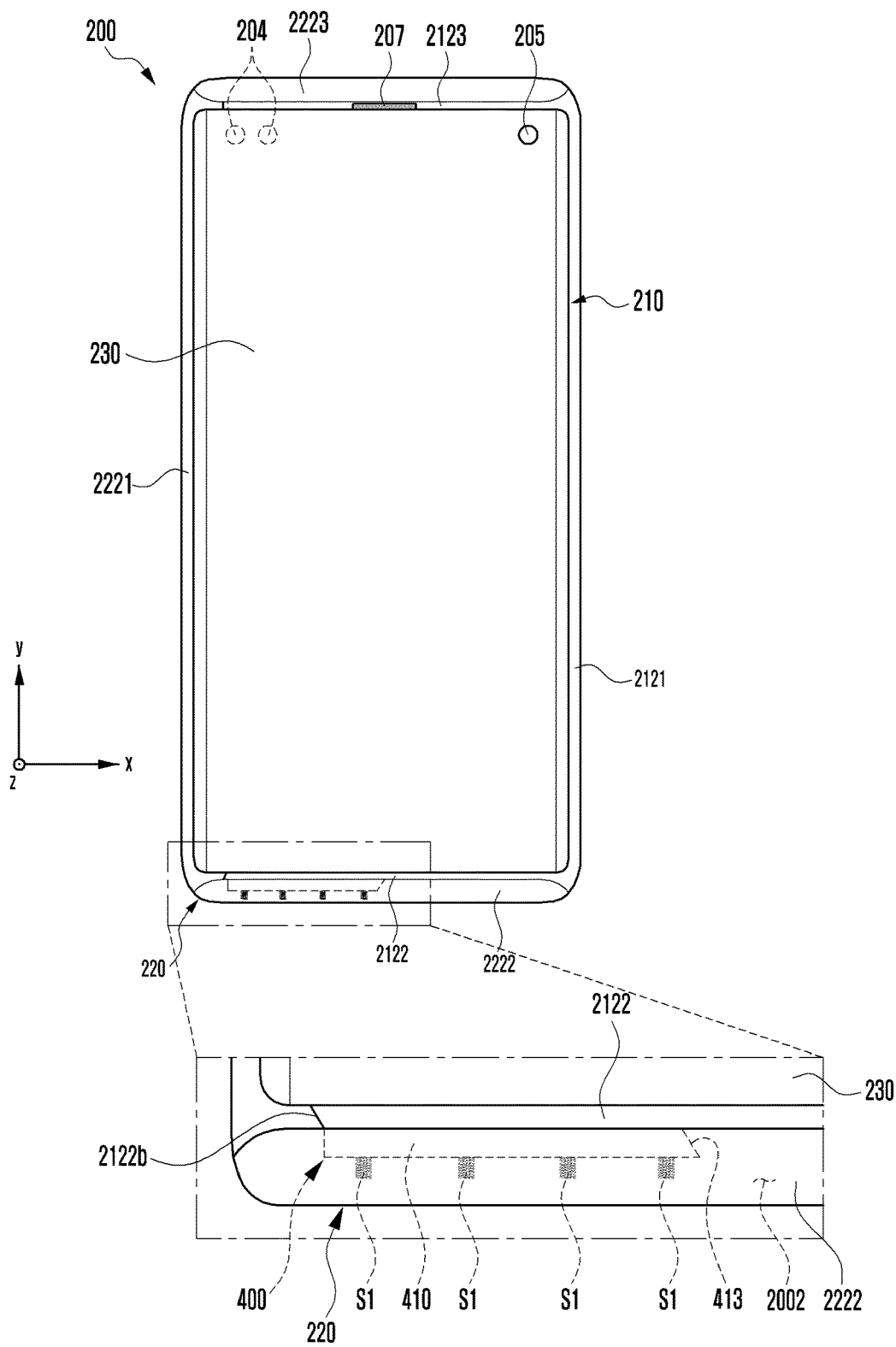
FIG. 12A is a view illustrating the configuration of the electronic device including a clearance compensation structure according to certain embodiments in the slide-in state.
Figure 12B:
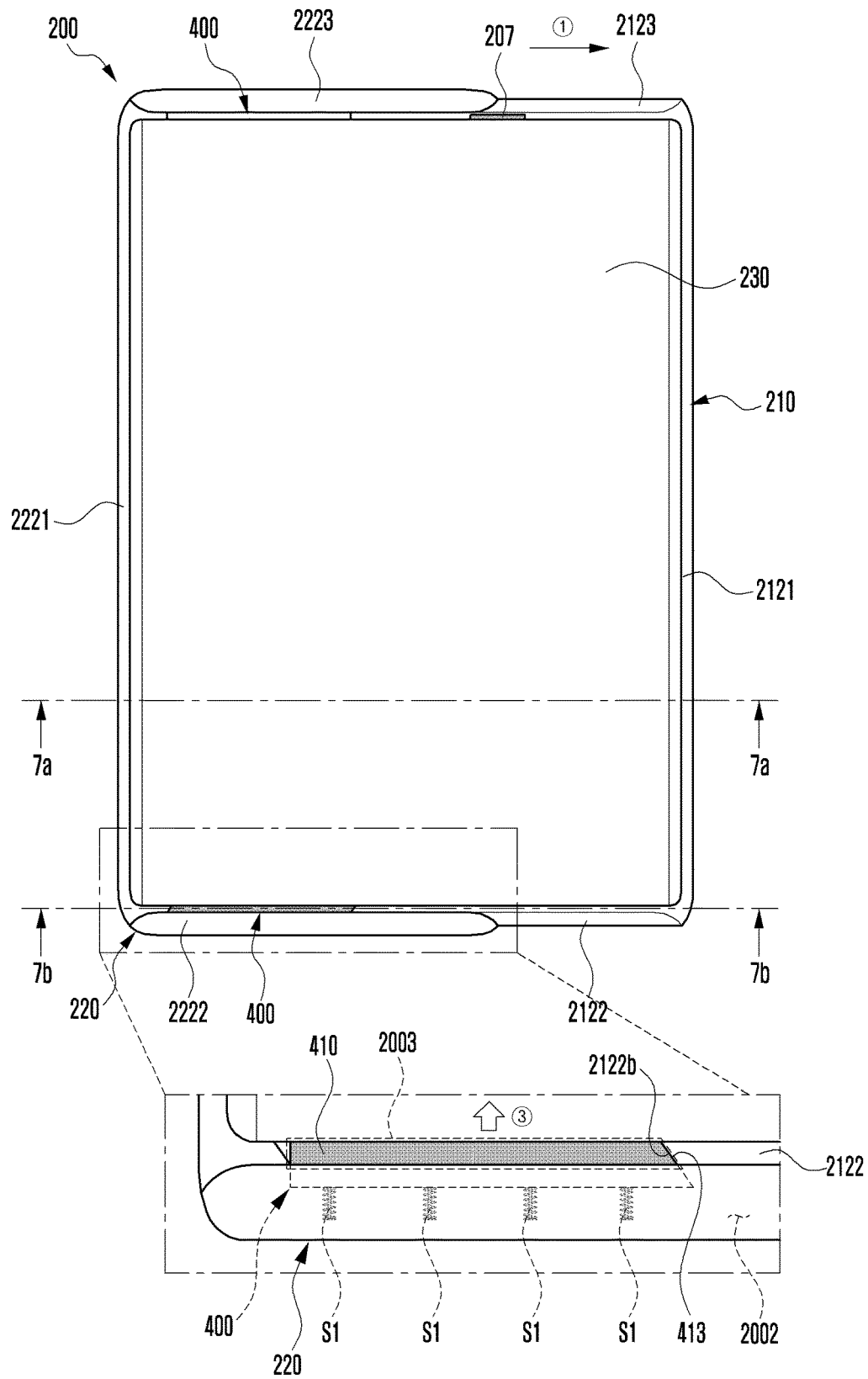
FIG. 12B is a view illustrating the configuration of the electronic device including the clearance compensation structure according to certain embodiments in the slide-out state.

FIG. 12A is a view illustrating the configuration of the electronic device 200 including the clearance compensation structure 400 according to certain embodiments in the slide-in state, and FIG. 12B is a view illustrating the configuration of the electronic device 200 including the clearance compensation structure 300 according to certain embodiments in the slide-out state.

In describing the components of the electronic device 200 of FIGS. 12A and 12B, the same reference numerals are given to components that are substantially the same as those of the electronic device 200 of FIGS. 6B and 7B, and a detailed description thereof may be omitted.

The guide block 310 of the clearance compensation structure 300 described above may be configured to move in the second space 2002 in a second direction (direction ②) (e.g., the z-axis direction in FIG. 4A) perpendicular to the first direction (direction ①) in which the first housing 210 is opened so as to close the clearance space 2003.

Referring to FIGS. 12A and 12B, in the state in which the electronic device 200 is closed, the guide block 410 of the clearance compensation structure 400 may be disposed in the second space 2002 in the second housing 220 while being regulated by the second side surface 2122 of the first housing 210. In this case, the guide block 410 may be supported via a coil spring S1 or a plate-shaped spring (e.g., the plate-shaped spring S2 in FIG. 11A). According to an embodiment, the clearance compensation structure 400 may be configured to operate in cooperation with the movement of the first housing 210. According to an embodiment, the guide block 410 may include an inclined portion 413 formed in an area corresponding to an end portion of the second side surface 2122 of the first housing 210. According to an embodiment, when the electronic device 200 is switched from the slide-out state to the slide-in state, the inclined portion 413 may be formed to have an inclined angle capable of moving the guide block 410 from the clearance space 2003 to the second space 2002 by being pressed by an end of the second side surface 2122. According to an embodiment, the second side surface 2122 may have an inclined surface 2122b corresponding to the inclined portion 413 of the guide block 410. According to an embodiment, in the state in which the electronic device 200 is opened, the inclined surface 2122a of the second side surface 2122 and the inclined portion 413 of the guide block 410 may be in surface contact with each other.

According to certain embodiments, in the slide-out state, the guide block 410 of the clearance compensation structure 400 may be configured to move in a third direction (direction ③) (e.g., the y-axis direction) perpendicular to the first direction (direction ①) in which the first housing 210 is opened and the second direction (e.g., the z-axis direction) in which the flexible display 230 is directed, so as to close the clearance space 2003. This may be a modified configuration which may be considered with the same closing effect as that described above when the spatial design for moving the guide block 410 in the second direction (e.g., the z-axis direction) in the second space 2002 is not easy.

Figure 13A:
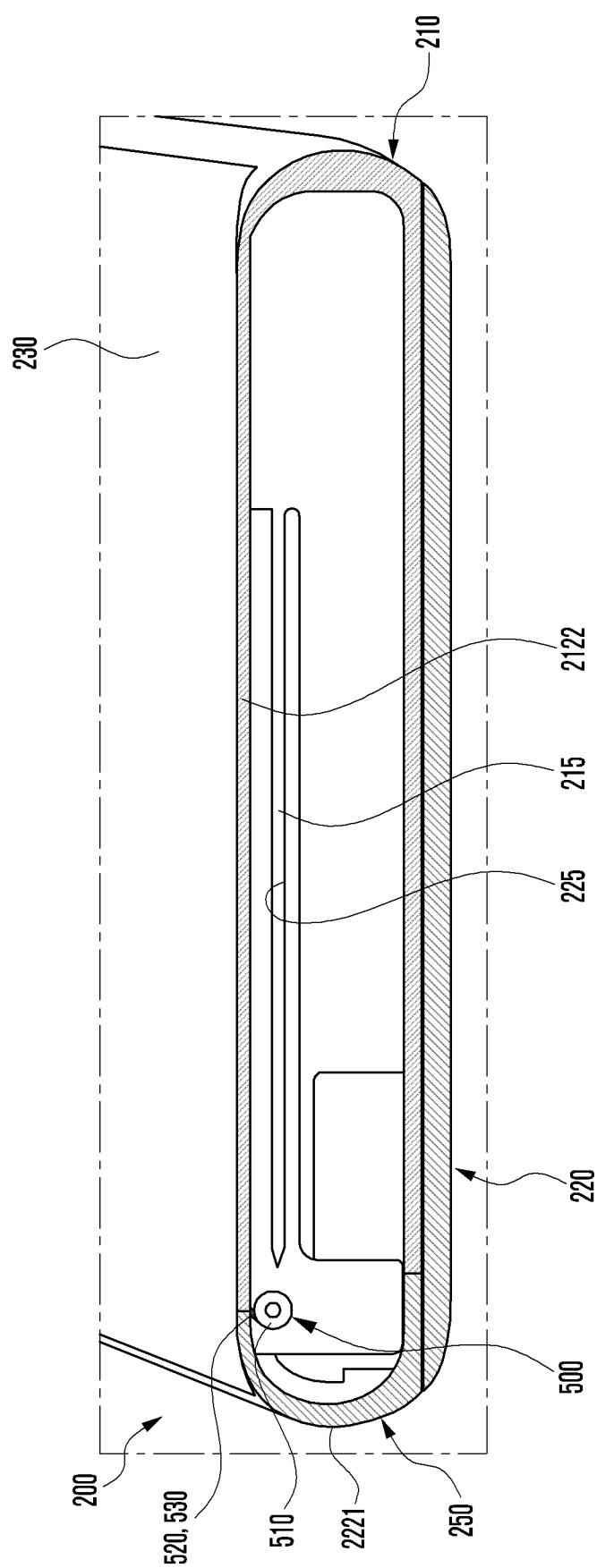
FIG. 13A is a view illustrating, in a partially cross-sectional view, the configuration of an electronic device including a clearance compensation structure according to certain embodiments in the slide-in state.
Figure 13B:
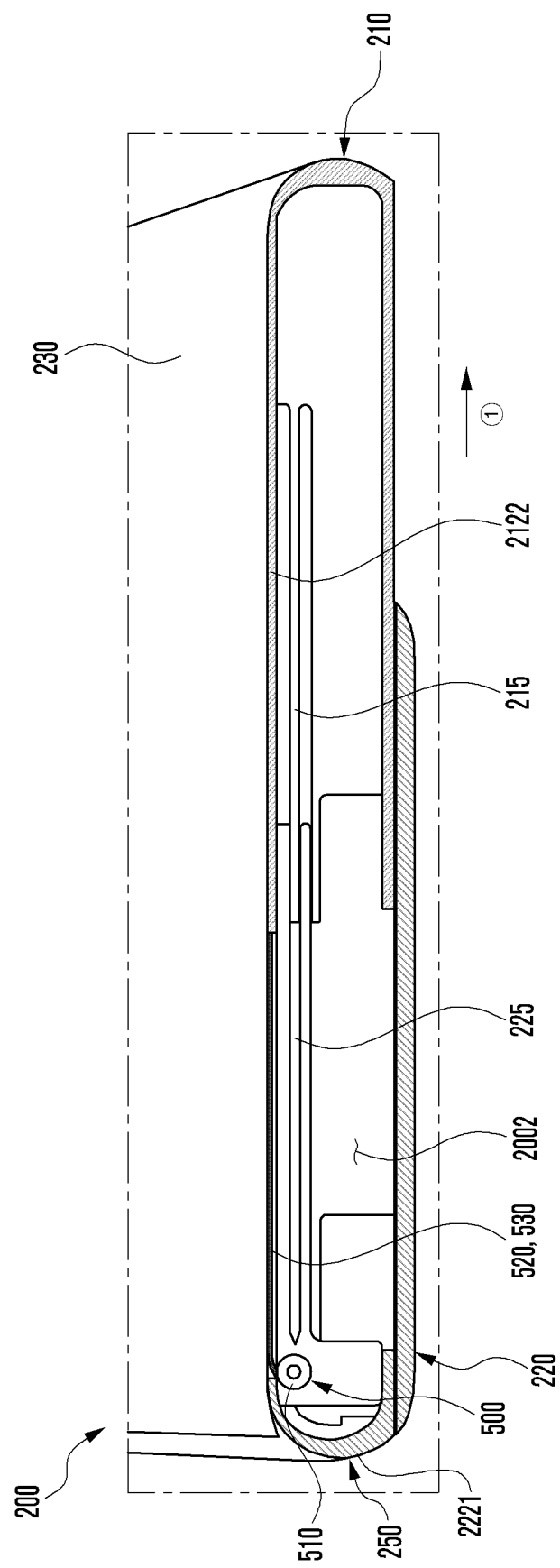
FIG. 13B is a view illustrating, in a partially cross-sectional view, the configuration of the electronic device including the clearance compensation structure according to certain embodiments in the slide-out state.

FIG. 13A is a view illustrating, in a partially cross-sectional view, the configuration of an electronic device 200 including a clearance compensation structure 500 according to certain embodiments in the slide-in state, and FIG. 13B is a view illustrating, in a partially cross-sectional view, the configuration of the electronic device 200 including the clearance compensation structure 500 according to certain embodiments in the slide-out state.

In describing the components of the electronic device 200 of FIGS. 13A and 13B, the same reference numerals are given to components that are substantially the same as those of the electronic device 200 of FIGS. 6B and 7B, and a detailed description thereof may be omitted.

Referring to FIGS. 13A and 13B, the electronic device 200 may include a first housing 210 and a second housing 220 that is coupled to be movable relative to the first housing 210. According to an embodiment, the housing 210 may include a guide rib 215 having a predetermined length and disposed adjacent to the second side surface 2122. According to an embodiment, the second housing 220 may include a guide rail 225 into which the guide rib 215 is inserted and which guides the inserted guide rib 215. Accordingly, the first housing 210 may perform a switching operation to the slide-out state or the slide-in state with respect to the second housing 220 by the guide structure using the guide rib 215 and the guide rail 225.

According to certain embodiments, the electronic device 200 may include a clearance compensation structure 500 for closing the clearance space 2003 (e.g., a clearance portion) generated by the first housing 210 spaced apart from the second housing 220 in the slide-out state. According to an embodiment, the clearance compensation structure 500 may include a rotation roller 510 disposed in at least a portion of the second space 2002 of the housing 220 and a band-shaped blocking member 520 or 530 one end of which is at least partially wound on the rotation roller 510 and the other end of which fixed to an end of the second side surface 2122 of the first housing 210. According to an embodiment, the rotation roller 510 may be disposed in the second space 2002 of the second housing 220 to be rotatable to wind the blocking member 520 or 530 in response to the opening/closing operation of the first housing 210.

Unlike the above-described configuration that closes the clearance space 2003 only when the first housing 210 is completely opened, the clearance compensation structure 500 according to the exemplary embodiments is capable of adaptively closing at least a portion of the clearance space 2003 even when the first the first housing 210 is moving. Thus, the clearance compensation structure 500 may be advantageously applied to a rollable electronic device of a manually opened/closed type in which the first housing 210 is partially opened from the second housing 220.

Figure 14A:
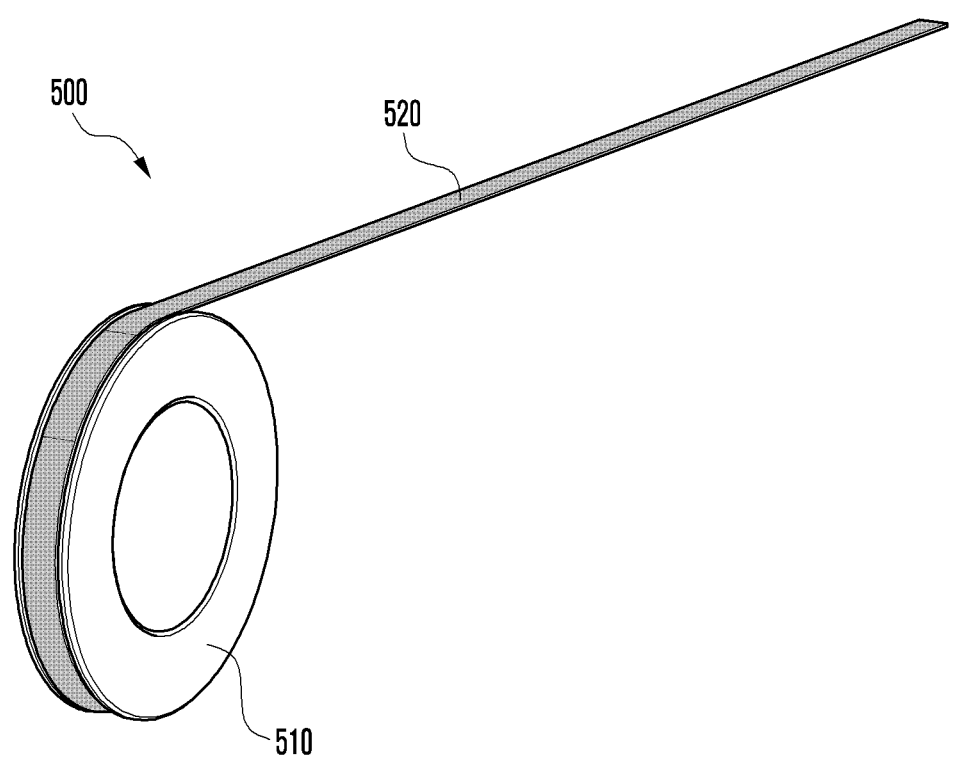
FIG. 14A is a perspective view illustrating the clearance compensation structure of FIG. 13A.
Figure 14B:
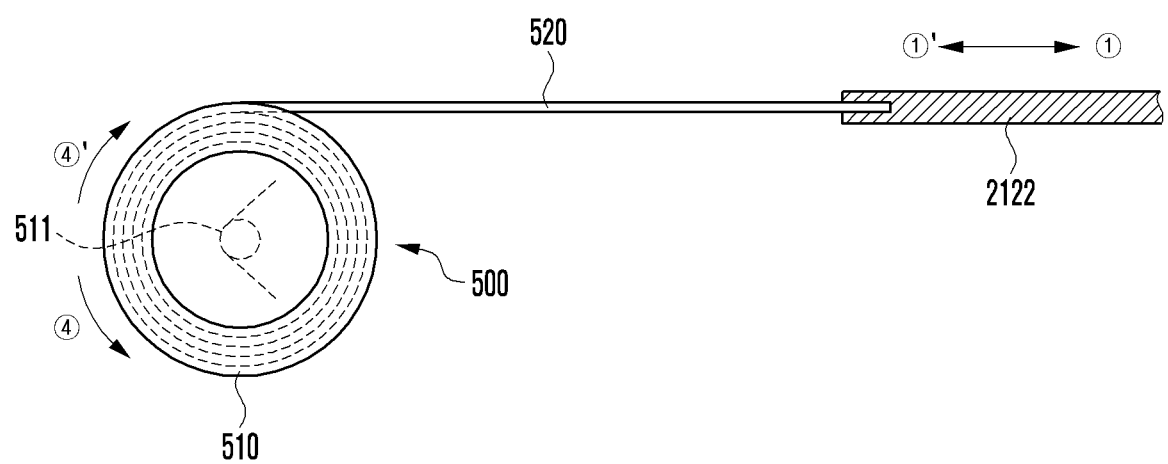
FIG. 14B is a view illustrating the operation state of the clearance compensation structure of FIG. 14A according to the opening/closing operation of the electronic device according to certain embodiments.

FIG. 14A is a perspective view illustrating the clearance compensation structure 500 of FIG. 13A. FIG. 14B is a view illustrating the operation state of the clearance compensation structure 500 of FIG. 14A according to the opening/closing operation of the electronic device according to certain embodiments.

Referring to FIGS. 14A and 14B, the clearance compensation structure 500 may include a rotation roller 510, and a blocking member 520 one end of which is wound on the rotation roller 510 and the other end of which is fixed to the second side surface 2122 of the first housing 210. According to an embodiment, the blocking member 520 may include a film of a polymer material or a metal material. In an embodiment, when the second side surface 2122 moves in the opening direction (direction ①), the rotation roller 510 may rotate in a clockwise direction (direction ④'), and when the second side surface 2122 moves in the closing direction (direction ①'), the rotation roller 510 may be rotated in a counterclockwise direction (direction ④). In this case, the rotation roller 510 may be always pressed in the direction in which the blocking member is wound (direction ④) via a torsion spring 511. Accordingly, the blocking member 520 may always maintain tight elasticity according to the opening/closing operation of the first housing 210 with respect to the second side surface 2122 of the rotation roller 510.

Figure 15A:
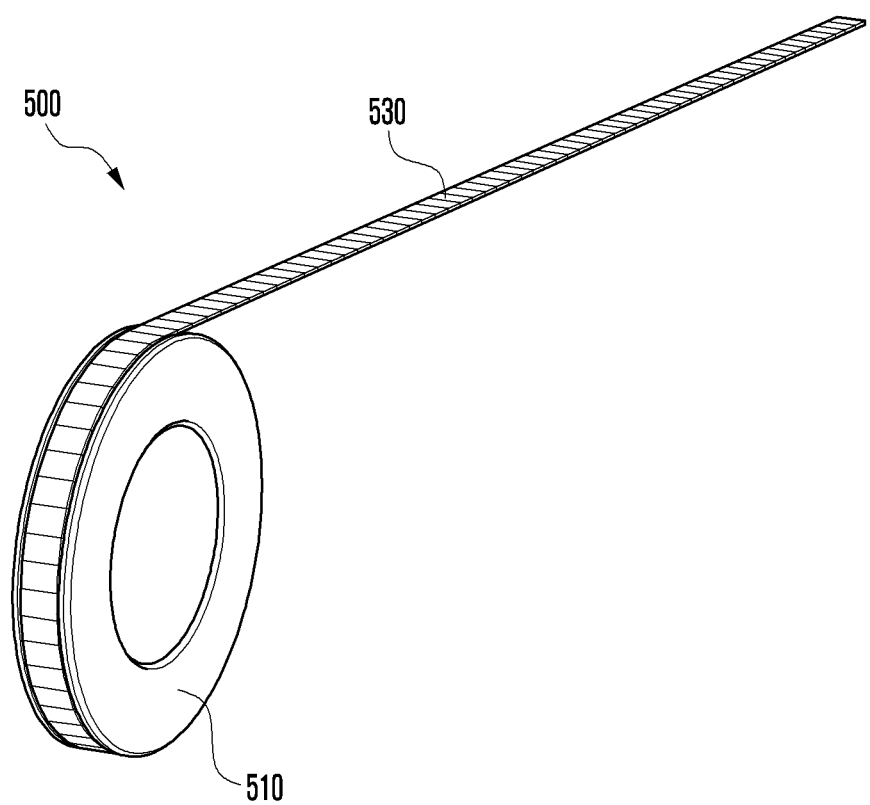
FIG. 15A is a perspective view illustrating the clearance compensation structure of FIG. 13A.
Figure 15B:
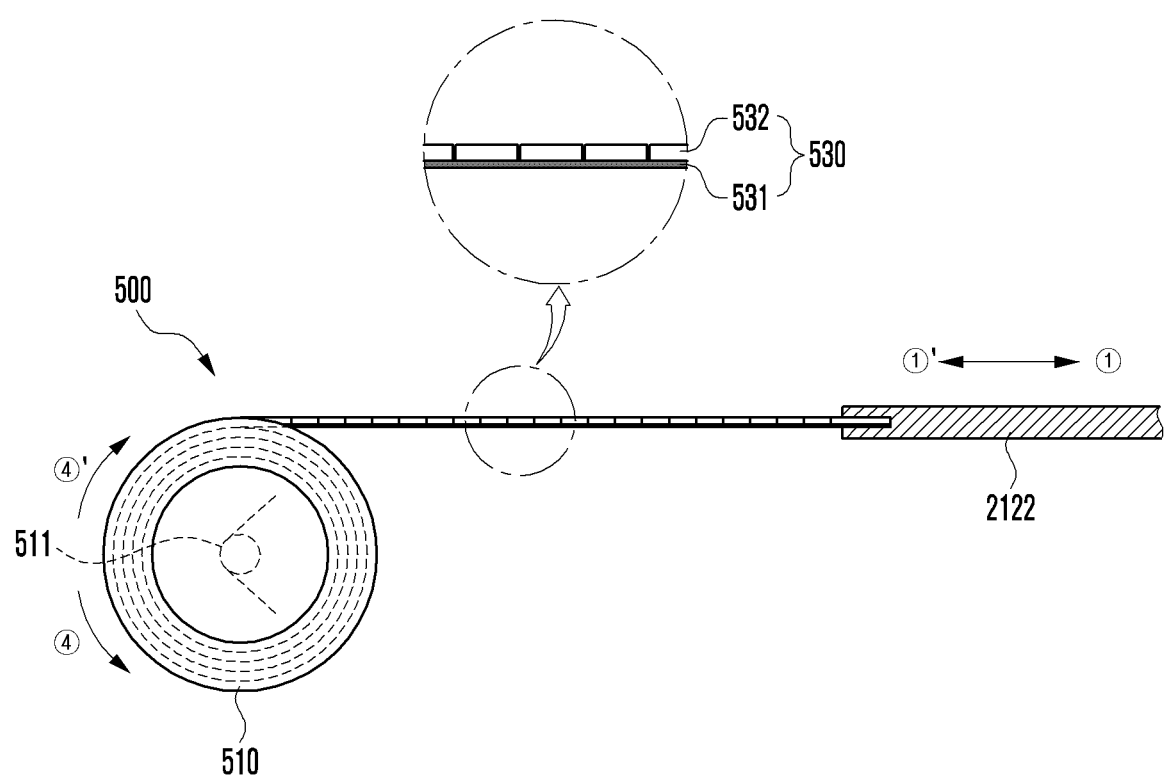
FIG. 15B is a view illustrating the operation state of the clearance compensation structure of FIG. 15A according to the opening/closing operation of the electronic device according to certain embodiments.

FIG. 15A is a perspective view illustrating the clearance compensation structure 500 of FIG. 13A. FIG. 15B is a view illustrating the operation state of the clearance compensation structure 500 of FIG. 15A according to the opening/closing operation of the electronic device 200 according to certain embodiments.

Referring to FIGS. 15A and 15B, the blocking member 530 may include a film 531 and a plurality of support blocks 532 attached to the top surface of the film 531 at regular intervals. According to an embodiment, the film 531 and the support blocks 532 may be wound together on the rotation roller 510 through the rotation of the rotation roller 510, and when the second side surface 2122 is moved in the opening direction (direction (D), the film 531 and the support block 532 may block the clearance space 2003 together. In this case, a more reinforced rigid structure may be provided through the blocking member 530 including the plurality of support blocks 532.

Figure 16A:
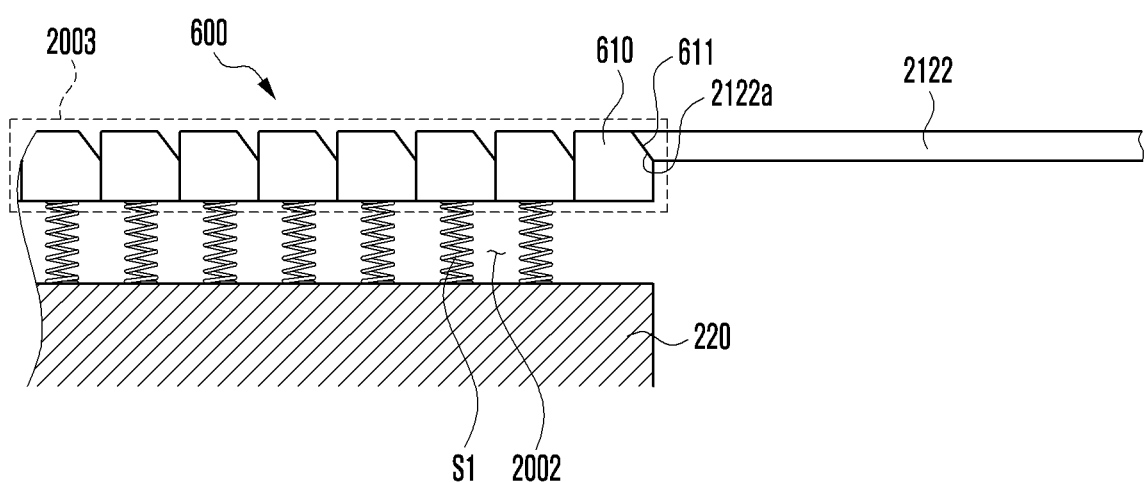
FIG. 16A is a view illustrating the configuration of a clearance compensation structure operating in cooperation with the opening/closing operation of the electronic device according to certain embodiments.
Figure 16B:
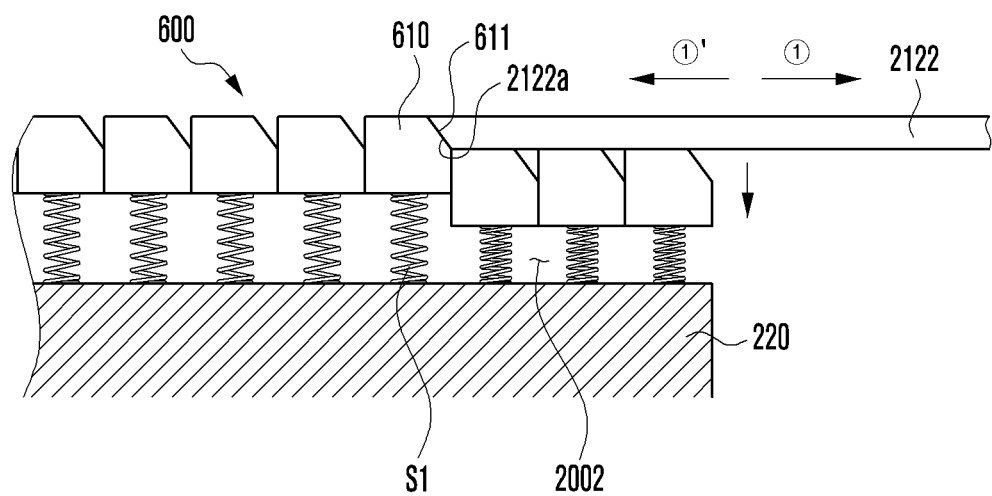
FIG. 16B is a view illustrating the configuration of a clearance compensation structure operating in cooperation with the opening/closing operation of the electronic device according to certain embodiments.

FIG. 16A is a view illustrating the configuration of a clearance compensation structure 600 operating in cooperation with the opening/closing operation of the electronic device according to certain embodiments; and FIG. 16B is a view illustrating the configuration of a clearance compensation structure 600 operating in cooperation with the opening/closing operation of the electronic device according to certain embodiments.

Referring to FIGS. 16A and 16B, the clearance compensation structure 600 may include a plurality of guide blocks 610 arranged to be supported by the second housing (e.g., the second housing 220 in FIG. 4A) in the second space 2002. According to an embodiment, each of the plurality of guide blocks 610 may be pressed toward the clearance space 2003 through corresponding one of coil springs S1. Although not illustrated, each of the plurality of guide blocks 610 has an engagement structure (e.g., the engagement portion 312 and the engagement step 223 in FIG. 6B) described above, thereby being prevented from departing from the second housing 220.

According to certain embodiments, each of the plurality of guide blocks 610 may include an inclined portion 611 corresponding to the inclined surface 2122a formed at an end of the second side surface 2122. According to an embodiment, the plurality of guide blocks 610 are substantially in contact with each other, but may be arranged to operate individually without interlocking with each other. According to an embodiment, when the second side when 2122 is moved in the opening direction (direction ①) or in the closing direction (direction ①'), among the plurality of the guide block 610, only the guide blocks 610 corresponding to the movement amount of the second side surface 2122 are introduced into the second space 2002, and the remaining guide blocks 610 close the remaining space in the clearance space 2003. Thus, even during the operation of switching from the slide-out state to the slide-in state or from the slide-in state to the slide-out state, the plurality of guide blocks 610 can help to adaptively close a clearance portion between the slide-out state and the slide-in state.

According to certain embodiments, in the slide-out state, by providing a clearance compensation structure for compensating for a clearance generated between two housings, it is possible to prevent inflow of foreign matter, and thus to help to secure the operational reliability of the rollable electronic device.

According to certain embodiments, an electronic device (e.g., the electronic device 200 in FIG. 4A) may include housings, a flexible display, and a clearance compensation structure. The housings may include: a first housing (e.g., the first housing 210 in FIG. 4A) including a first plate (e.g., the first plate 211 in FIG. 4A) including a first surface (e.g., the first surface 2101 in FIG. 4A) and a second surface (e.g., the second surface 2102 in FIG. 4A) facing away from the first surface, and a first side frame (e.g., the first side frame 212 in FIG. 4A) forming a first space (e.g., the first space 2001 in FIG. 4A) to surround at least a portion of the first plate; and a second housing (e.g., the second housing 220 in FIG. 4A) including a second plate (e.g., the second plate 221 in FIG. 4A) including a third surface (e.g., the third surface 2201 in FIG. 4A) facing the same direction as the first surface and a fourth surface (e.g., the fourth surface 2202 in FIG. 4A) facing away from the third surface, and a second side frame (e.g., the second side frame 222 in FIG. 4A) forming a second space (e.g., the second space 2002 in FIG. 4A) to surround at least a portion of the second plate. At least a portion of the first side frame of the first housing is coupled to at least a portion of the second side frame to be slidable in a first direction (e.g., direction ① in FIG. 5B), and the first housing is disposed to be movable between a slide-out state and a slide-in state relative to the second housing. The flexible display (e.g., the flexible display 230 in FIG. 4A) may include a first portion (e.g., the first portion 231 in FIG. 4A) extending across at least a portion of the third surface, and a second portion (e.g., the second portion 232 in FIG. 4A) extending from the first portion and located in the first space in the slide-in state of the first housing. When the first housing is switched from the slide-in state to the slide-out state, at least a portion of the second portion is exposed to an outside so as to form a substantially same plane as the first portion. The clearance compensation structure (e.g., the clearance compensation structure 300 in FIG. 4A) may be disposed in the second space and may be configured to compensate for a clearance space (e.g., the clearance space 2003 in FIG. 5B) generated in the second housing when the first housing is switched from the slide-in state to the slide-out state.

According to certain embodiments, the clearance compensation structure may include a guide block (e.g., the guide block 310 in FIG. 4A) disposed to be movable between the second space and the clearance space, and an elastic member (e.g., the coil springs S1 in FIG. 4A) configured to press the guide block toward the third direction. In the slide-out state, the guide block may be moved to the clearance space by being pressed by the elastic member.

According to certain embodiments, the elastic member may include at least one of a coil spring, a plate-shaped spring, an elastic clip, or an elastic material such as rubber or silicone disposed between the guide block and the second housing in the second space.

According to certain embodiments, the guide block may include an inclined portion (e.g., the inclined surface 313 in FIG. 6B) formed at a position facing a portion (e.g., the inclined surface 2122a in FIG. 6B) of the first housing that is in contact with the guide block, and when the first housing is switched to the slide-in state, the guide block may be moved to the second space through an operation in which the portion of the first housing pushes the inclined portion.

According to certain embodiments, the portion of the first housing may include an inclined surface (e.g., the inclined surface 2122a in FIG. 6B) correspondingly formed to be in surface contact with the inclined portion.

According to certain embodiments, a surface contact portion between the inclined portion and the inclined surface may at least partially include a flat surface or curved surface.

According to certain embodiments, the guide block may include a magnetic force generation member (e.g., the magnetic force generation member M1 in FIG. 6B), and the first housing may include a magnetic force reaction member (e.g., the magnetic force reaction member M2 in FIG. 6B) disposed in a region in which the magnetic force reaction member is affected by magnetic force of the magnetic force generation member in the slide-out state.

According to certain embodiments, in the slide-out state, the guide block may maintain a position thereof in the clearance space via the magnetic force reaction member affected by the magnetic force of the magnetic force generation member.

According to certain embodiments, the magnetic force generation member may include a magnet, and the magnetic force reaction member may include a magnet or a metal member affected by the magnetic force.

According to certain embodiments, in the slide-out state, the guide block may be moved from the second space to the clearance space in a second direction (e.g., direction ② in FIG. 7B) perpendicular to the first direction.

According to certain embodiments, in the slide-out state, the guide block (e.g., the guide block 410 in FIG. 12B) may be moved from the second space to the clearance space in a third direction (e.g., third direction ③ in FIG. 12B) perpendicular to the first direction and the second direction.

According to certain embodiments, the electronic device may further include a first guide plate (e.g., the first guide plate 240 in FIG. 4A) disposed in the first space to correspond to the first surface and including at least one guide protrusion (e.g., the guide protrusion 241 in FIG. 4A), and a second guide plate (e.g., the second guide plate 250 in FIG. 4A) disposed in the second space to correspond to the third surface and including at least one guide slit (e.g., the guide slit 251 in FIG. 4A). The first housing may be opened/closed from the second housing through a method in which the guide protrusion of the first guide plate is guided to the guide slit in the second guide plate.

According to certain embodiments, the electronic device may further include a driving unit (e.g., the driving unit 260) disposed between the first plate and the first guide plate in the first space, and including at least one driving motor (e.g., the driving motor 261 in FIG. 4A) and a pinion gear (e.g., the pinion gear 262 in FIG. 4A) installed to be rotated via the driving motor. The pinion gear may be disposed to mesh with a rack gear (e.g., the rack gear 252 in FIG. 6A) formed on the second guide plate, and the first housing is automatically opened/closed from the second housing through a method in which the pinion gear is rotated on the rack gear.

According to certain embodiments, the electronic device may further include a guide rib (e.g., the guide rib 215 in FIG. 13A) formed in at least a portion of the first side frame, and a guide rail (e.g., the guide rail 225 in FIG. 13A) formed on at least a portion of the second side frame and configured to guide the guide rib, and the clearance space may be generated due to separation between the guide rib and the guide rail in the slide-out state.

According to certain embodiments, the clearance compensation structure (e.g., the clearance compensation structure 500 in FIG. 13A) may include a rotation roller (e.g., the rotation roller 510 in FIG. 13A) rotatably disposed in the second space, and a band-shaped blocking member (e.g., the blocking member 520 or 530 in FIG. 13A) wound on the rotation roller at one end and fixed to at least a portion of the first housing at the other end. During switching from the slide-in state to the slide-out state, the blocking member wound on the rotation roller may be moved to block the clearance space according to the movement of the first housing.

According to certain embodiments, the blocking member (e.g., the blocking member 520 in FIG. 14B) may include a film formed of a polymer or a metal material.

According to certain embodiments, the electronic device may further include a plurality of support blocks (e.g., the support blocks 532 in FIG. 15B) arranged at regular intervals on the top surface of the film (e.g., the film 531 in FIG. 15B).

According to certain embodiments, the rotation roller may further include an elastic member (e.g., the torsion spring 511 in FIG. 14B) configured to press the blocking member in a direction in which the blocking member is to be wound.

According to certain embodiments, the clearance compensation structure (e.g., the clearance compensation structure 600 in FIG. 16A) may include a plurality of guide blocks (e.g., the plurality of guide blocks 610 in FIG. 16A) disposed to be individually movable between the second space and the clearance space, and a plurality of elastic members (e.g., the coil springs S1 in FIG. 16A) each configured to individually press corresponding one of the plurality of guide blocks toward the third direction.

According to certain embodiments, each of the plurality of guide blocks may include an inclined portion (e.g., the inclined portion 611 in FIG. 16A) formed at a position facing a portion (e.g., the inclined portion 2122*a* in FIG. 16A) of the first housing that is in contact with each of the plurality of guide blocks, and when the first housing is switched from the slide-in state to the slide-out state or from the slide-out state to the slide-in state, each of the plurality of guide blocks may be individually moved to the second space through an operation in which the portion of the first housing pushes the inclined portion.

Certain embodiments of the disclosure disclosed in this specification and drawings are provided merely to easily describe the technical contents of the disclosure and to help understanding of the embodiments of the disclosure, and are not intended to limit the scope of the disclosure. Accordingly, the scope of the certain embodiments of the disclosure should be construed in such a manner that, in addition to the embodiments disclosed herein, all changes or modifications derived from the technical idea of the certain embodiments of the disclosure are included in the scope of the certain embodiments of the disclosure.

What is claimed is:
1. An electronic device comprising:
   a first housing comprising a first plate having a first surface and a second surface facing away from the first surface, and a first side frame forming a first space and at least partially surrounding the first plate; and
   a second housing comprising a second plate comprising a third surface facing a same direction as the first surface and a fourth surface facing away from the third surface, and a second side frame forming a second space and at least partially surrounding the second plate,
   wherein at least a portion of the first side frame of the first housing is coupled to at least a portion of the second side frame to be slidable in a first direction, and the first housing movable between an slide-out state and a slide-in state relative to the second housing;
   a flexible display comprising:
      a first portion extending across at least a portion of the third surface; and
      a second portion extending from the first portion and located in the first space in the slide-in state of the first housing,
   wherein, when the first housing is switched from the slide-in state to the slide-out state, at least a portion of the second portion is exposed to an outside so as to form a substantially same plane as the first portion; and
   a clearance compensation structure disposed in the second space and configured to at least partially cover a clearance space generated between the second side frame and the flexible display when the first housing is switched from the slide-in state to the slide-out state.

2. The electronic device of claim 1, wherein the clearance compensation structure comprises:
   a guide block disposed to be movable between the second space and the clearance space; and
   an elastic member configured to press the guide block toward a third direction, and
   wherein, in the slide-out state, the guide block is moved to the clearance space by being pressed by the elastic member.

3. The electronic device of claim 2, wherein the elastic member comprises at least one of a coil spring, a plate-shaped spring, an elastic clip, or an elastic material such as rubber or silicone disposed between the guide block and the second housing in the second space.

4. The electronic device of claim 2, wherein the guide block comprises an inclined portion formed at a position facing a portion of the first housing that is in contact with the guide block, and
   when the first housing is switched to the slide-in state, the guide block is retracted into the second space, wherein the portion of the first housing pushes the inclined portion.

5. The electronic device of claim 4, wherein the portion of the first housing includes an inclined surface correspondingly formed to be in surface contact with the inclined portion.

6. The electronic device of claim 5, wherein a surface contact portion between the inclined portion and the inclined surface at least partially comprises a flat surface or curved surface.

7. The electronic device of claim 2, wherein the guide block comprises a magnet, and
   the first housing comprises magnetic material disposed in a region in which the magnetic material is affected by magnetic force of the magnet in the slide-out state.

8. The electronic device of claim 7, wherein, in the slide-out state, the magnetic force causes the guide block to maintains a position at least partially closing the clearance space.

9. The electronic device of claim 7, wherein the magnetic material comprises another magnet or a metal member affected by the magnetic force.

10. The electronic device of claim 2, wherein, in the slide-out state, the guide block is moved from the second space to at least partially cover the clearance space in a second direction substantially perpendicular to the first direction.

11. The electronic device of claim 10, wherein, in the slide-out state, the guide block is moved from the second space to at least partially cover the clearance space in the third direction substantially perpendicular to the first direction and the second direction.

12. The electronic device of claim 1, further comprising:
a first guide plate disposed in the first space to correspond to the first surface and including at least one guide protrusion; and
a second guide plate disposed in the second space to correspond to the third surface and including at least one guide slit,
wherein the first housing is opened/closed from the second housing by guiding the guide protrusion of the first guide plate to the guide slit in the second guide plate.

13. The electronic device of claim 12, further comprising:
a driving unit disposed between the first plate and the first guide plate in the first space, and comprising at least one driving motor and a pinion gear installed to be rotated via the driving motor,
wherein the pinion gear is disposed to mesh with a rack gear formed on the second guide plate, and
wherein the first housing is automatically opened/closed from the second housing through a method in which the pinion gear is rotated on the rack gear.

14. The electronic device of claim 1, further comprising:
a guide rib formed in at least a portion of the first side frame; and
a guide rail formed on at least a portion of the second side frame and configured to guide the guide rib,
wherein the clearance space is generated due to separation between the guide rib and the guide rail in the slide-out state.

15. The electronic device of claim 1, wherein the clearance compensation structure comprises:
a rotation roller rotatably disposed in the second space; and
a band-shaped blocking member wound on the rotation roller at one end and fixed to at least a portion of the first housing at another end,
wherein during switching from the slide-in state to the slide-out state, the band-shaped blocking member is moved to at least partially block the clearance space according to movement of the first housing.

16. The electronic device of claim 15, wherein the blocking member comprises a film formed of a polymer or a metal material.

17. The electronic device of claim 16, further comprising:
a plurality of support blocks arranged at regular intervals on a top surface of the film.

18. The electronic device of claim 15, wherein the rotation roller further comprises an elastic member configured to press the blocking member in a direction in which the blocking member is to be wound.

19. The electronic device of claim 1, wherein the clearance compensation structure comprises:
a plurality of guide blocks disposed to be individually movable from the second space and to at least partially cover the clearance space; and
a plurality of elastic members each configured to individually press corresponding one of the plurality of guide blocks toward a third direction.

20. The electronic device of claim 19, wherein each of the plurality of guide blocks comprises an inclined portion formed at a position facing a portion of the first housing that is in contact with each of the plurality of guide blocks, and
when the first housing is switched from the slide-in state to the slide-out state or from the slide-out state to the slide-in state, each of the plurality of guide blocks is individually moved to the second space through an operation in which the portion of the first housing pushes the inclined portion.

* * * * *